United States Patent
Suzuki et al.

(10) Patent No.: US 9,723,593 B2
(45) Date of Patent: Aug. 1, 2017

(54) TERMINAL DEVICE, BASE STATION DEVICE, INTEGRATED CIRCUIT, AND RADIO COMMUNICATION METHOD

(71) Applicant: Sharp Kabushiki Kaisha, Osaka-shi, Osaka (JP)

(72) Inventors: Shoichi Suzuki, Osaka (JP); Yasuyuki Kato, Osaka (JP); Katsunari Uemura, Osaka (JP); Daiichiro Nakashima, Osaka (JP); Tatsushi Aiba, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 122 days.

(21) Appl. No.: 14/438,314

(22) PCT Filed: Mar. 24, 2014

(86) PCT No.: PCT/JP2014/058119
§ 371 (c)(1),
(2) Date: Apr. 24, 2015

(87) PCT Pub. No.: WO2014/162913
PCT Pub. Date: Oct. 9, 2014

(65) Prior Publication Data
US 2015/0289246 A1 Oct. 8, 2015

(30) Foreign Application Priority Data
Apr. 3, 2013 (JP) ................................. 2013-077370

(51) Int. Cl.
*H04W 72/04* (2009.01)
*H04W 52/02* (2009.01)
(Continued)

(52) U.S. Cl.
CPC ....... *H04W 72/0406* (2013.01); *H04L 1/1812* (2013.01); *H04L 1/1851* (2013.01);
(Continued)

(58) Field of Classification Search
CPC ........... H04W 72/0406; H04W 72/042; H04W 72/0446; H04W 72/1263–72/1273;
(Continued)

(56) References Cited

U.S. PATENT DOCUMENTS

2012/0281600 A1* 11/2012 Tseng .................. H04W 76/048 370/280
2014/0086112 A1* 3/2014 Stern-Berkowitz ........ H04W 72/1289 370/280
(Continued)

OTHER PUBLICATIONS

Ericsson et al., "On standardization impact of TDD UL-DL adaptation", 3GPP TSG-RAN WG1 #69, R1-122016, May 21-25, 2012, pp. 1-3.
(Continued)

*Primary Examiner* — Pao Sinkantarakorn
(74) *Attorney, Agent, or Firm* — Keating & Bennett, LLP

(57) ABSTRACT

A terminal apparatus sets a first UL-DL configuration, receives information indicating a second UL-DL configuration via a physical downlink control channel, and monitors a physical downlink control channel with a C-RNTI, during an active time based on a first subframe which is set as a downlink subframe or a subframe including a downlink pilot time slot (DwPTS) on the basis of the first UL-DL configuration, in a second subframe which is set as a downlink subframe or a subframe including a DwPTS on the basis of the second UL-DL configuration.

12 Claims, 26 Drawing Sheets

(51) Int. Cl.
  *H04L 1/18* (2006.01)
  *H04W 76/02* (2009.01)
  *H04W 76/04* (2009.01)
  *H04L 5/14* (2006.01)
  *H04L 5/00* (2006.01)
  *H04W 88/08* (2009.01)

(52) U.S. Cl.
  CPC .......... *H04L 1/1854* (2013.01); *H04L 1/1883* (2013.01); *H04L 1/1887* (2013.01); *H04L 5/0092* (2013.01); *H04L 5/1469* (2013.01); *H04W 52/0216* (2013.01); *H04W 72/0446* (2013.01); *H04W 76/021* (2013.01); *H04W 76/048* (2013.01); *H04L 5/001* (2013.01); *H04L 5/0023* (2013.01); *H04L 5/0048* (2013.01); *H04L 5/0055* (2013.01); *H04W 88/08* (2013.01); *Y02B 60/50* (2013.01)

(58) Field of Classification Search
  CPC ......... H04W 72/1278; H04W 72/1289; H04W 76/048; H04L 1/1812; H04L 1/1861; H04L 1/1864; H04L 1/1893; H04L 1/1896; H04L 5/0055
  See application file for complete search history.

(56) References Cited

U.S. PATENT DOCUMENTS

| | | |
|---|---|---|
| 2014/0161001 A1 | 6/2014 | Gao et al. |
| 2014/0185467 A1* | 7/2014 | Heo ................. H04W 52/0216 370/252 |

OTHER PUBLICATIONS

Ericsson et al., "Signalling support for dynamic TDD", 3GPP TSG-RAN WG1 #72, R1-130558, Jan. 28-Feb. 1, 2013, 3 pages, Oct. 28, 2016.

Suzuki, S. et al.; "Terminal Device, Integrated Circuit, and Radio Communication Method"; U.S. Appl. No. 14/787,191, filed Oct. 26, 2015.

* cited by examiner

FIG. 9

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U OR D |
| (c) | S | S OR D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U OR D |
| (g) | S | S | S |
| (h) | S | D | S OR D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 25

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| HALF-DUPLEX TDD | PDCCH SUBFRAME | P | P | | | | P | P | P | P | P |

FIG. 26

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | D | D | S | U | U | D |
| | SECOND DOWNLINK REFERENCE UL-DL CONFIGURATION 5 | D | S | U | D | D | D | D | D | D | D |
| HALF-DUPLEX TDD | PDCCH SUBFRAME | P | P | | | | P | P | P | P | P |

FIG. 27

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | D | D | S | U | U | D |
| | SECOND DOWNLINK REFERENCE UL-DL CONFIGURATION 5 | D | S | U | D | D | D | D | D | D | D |
| FULL-DUPLEX TDD | PDCCH SUBFRAME | P | P | | P | P | P | P | P | P | P |

FIG. 28

| SFN | 0 | | | | | | | | | | 1 | | | | | | | | | | 2 | | | | | | | | | |
|---|---|---|---|---|---|---|---|---|---|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| FIRST UPLINK REFERENCE UL-DL CONFIGURATION 0 | D | S | U | U | U | D | S | U | U | U | D | S | U | U | U | D | S | U | U | U | D | S | U | U | U | D | S | U | U | U |
| FIRST DOWNLINK REFERENCE UL-DL CONFIGURATION 2 | D | S | U | D | D | D | S | U | D | D | D | S | U | D | D | D | S | U | D | D | D | S | U | D | D | D | S | U | D | D |
| PDCCH SUBFRAME | P | P | | | P | P | P | P | P | P | P | P | P | P | P | P | P | P | P | P | P | P | P | P | P | P | P | | | |
| UPLINK HARQ PROCESS NUMBER | | 0 | 1 | | 2 | 3 | | | 4 | 5 | | | 6 | 0 | 1 | | | 2 | 3 | 4 | | | 5 | 6 | 0 | | | 1 | 2 | 3 |
| UL grant | | | | | | G | | | | | | | | | | G | | | | | | | | | | | | | | |
| PUSCH | | | | | | | | | | N' | | | | | | | | | | | | R' | | | | | | | | |
| | 0 | 1 | | 2 | 3 | 4 | | | | | 0 | 1 | | | | | | | | | | | | | 1 | | | | | |
| PDSCH | N | N | N | N | N | N | | | | | | R | R | | | | | | | | | | | | R | | | | | |
| DOWNLINK HARQ PROCESS NUMBER | A | A | A | A | A | A | A | A | A | A | A | A | A | A | A | | | | | | A | A | A | A | A | A | | | | |
| ACTIVE TIME | 6 | 5 | 4 | 3 | 2 | 1 | | | | | | | | | | | | | | | | | | | | | | | | |
| onDurationTimer | | | | | | | | | | | | | | | | | | | | | | | | | | | | | | |
| drx-InactivityTimer | 2 | 2 | 2 | 2 | 2 | 1 | | 2 | 1 | | 3 | | | | | | | | | | 3 | - | 2 | 1 | | | | | | |
| drx-RetransmissionTimer#0 | | | | | | | | | | | 3 | | | | | | | | | | | | | | | | | | | |
| drx-RetransmissionTimer#1 | | | | | | | | | | | 3 | | | | | | | | | | | | | | | | | | | |
| HARQ RTT timer#0 | 11 | 10 | 9 | 8 | 7 | 6 | 5 | 4 | 3 | 2 | 1 | | | | | | | | | | | | | | | | | | | |
| HARQ RTT timer#1 | 10 | 9 | 8 | 7 | 6 | 5 | 4 | 3 | 2 | 1 | 0 | | 8 | 7 | 6 | 5 | 4 | 3 | 2 | 1 | 0 | | | | | | | | | |

FIG. 29

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| HALF-DUPLEX TDD | PDCCH SUBFRAME | P | P | | | | P | P | | | P |

FIG. 30

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | U | D | S | U | U | D |
| | SECOND DOWNLINK REFERENCE UL-DL CONFIGURATION 5 | D | S | U | D | D | D | D | D | D | D |
| HALF-DUPLEX TDD | PDCCH SUBFRAME | P | P | | | | P | P | | | P |

FIG. 31

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | D | D | S | U | U | D |
| | SECOND DOWNLINK REFERENCE UL-DL CONFIGURATION 5 | D | S | U | D | D | D | D | D | D | D |
| FULL-DUPLEX TDD | PDCCH SUBFRAME | P | P | | | P | P | P | | | P |

FIG. 32

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| HALF-DUPLEX TDD | PDCCH SUBFRAME | P | P | | | | P | P | | | P |

FIG. 33

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | D | D | S | U | U | D |
| | SECOND DOWNLINK REFERENCE UL-DL CONFIGURATION 5 | D | S | U | D | D | D | D | D | D | D |
| HALF-DUPLEX TDD | PDCCH SUBFRAME | P | P | | | | P | P | | | P |

FIG. 34

| | SUBFRAME NUMBER | 0 | 1 | 2 | 3 | 4 | 5 | 6 | 7 | 8 | 9 |
|---|---|---|---|---|---|---|---|---|---|---|---|
| PRIMARY CELL | FIRST UPLINK REFERENCE UL-DL CONFIGURATION 6 | D | S | U | U | U | D | S | U | U | D |
| | FIRST DOWNLINK REFERENCE UL-DL CONFIGURATION 3 | D | S | U | U | U | D | D | D | D | D |
| | TRANSMISSION DIRECTION UL-DL CONFIGURATION 6 | D | S | U | U | U | D | S | U | U | D |
| | SECOND UPLINK REFERENCE UL-DL CONFIGURATION 6 | D | S | U | U | U | D | S | U | U | D |
| | SECOND DOWNLINK REFERENCE UL-DL CONFIGURATION 3 | D | S | U | U | U | D | D | D | D | D |
| SECONDARY CELL | FIRST UPLINK REFERENCE UL-DL CONFIGURATION 0 | D | S | U | U | U | D | S | U | U | U |
| | FIRST DOWNLINK REFERENCE UL-DL CONFIGURATION 2 | D | S | U | D | D | D | S | U | D | D |
| | TRANSMISSION DIRECTION UL-DL CONFIGURATION 1 | D | S | U | U | D | D | S | U | U | D |
| | SECOND UPLINK REFERENCE UL-DL CONFIGURATION 0 | D | S | U | U | D | D | S | U | U | D |
| | SECOND DOWNLINK REFERENCE UL-DL CONFIGURATION 5 | D | S | U | D | D | D | D | D | D | D |
| FULL-DUPLEX TDD | PDCCH SUBFRAME | P | P | | | | P | P | | | P |

TERMINAL DEVICE, BASE STATION DEVICE, INTEGRATED CIRCUIT, AND RADIO COMMUNICATION METHOD

TECHNICAL FIELD

The present invention relates to a terminal apparatus, a base station apparatus, an integrated circuit, and a radio communication method.

BACKGROUND ART

A radio access method and a radio network (hereinafter, referred to as Long-Term Evolution (LTE) or Evolved Universal Terrestrial Radio Access (EUTRA)) of cellular mobile communication have been examined in the Third Generation Partnership Project (3GPP). In LTE, an orthogonal frequency division multiplexing (OFDM) method is used as a downlink communication method. In LTE, a single-carrier frequency division multiple access (SC-FDMA) method is used as an uplink communication method. In LTE, a base station apparatus is also referred to as evolved NodeB (eNodeB), and a mobile station apparatus is also referred to as user equipment (UE). LTE is a cellular communication system in which a plurality of areas covered by a base station apparatus are allocated in a cell form. A single base station apparatus may manage a plurality of cells.

LTE corresponds to a time division duplex (TDD). LTE employing the TDD is also referred to as TD-LTE or LTE TDD. The TDD is a technique which can realize full-duplex communication in a single frequency band through time division multiplexing of an uplink signal and a downlink signal.

In 3GPP, it has been examined that a traffic adaptation technique and an interference reduction technique (DL-UL interference management and traffic adaptation) in which a ratio of an uplink resource and a downlink resource is changed depending on uplink traffic and downlink traffic are applied to the TD-LTE.

In NPL 1, a method of using a flexible subframe is proposed as a method of realizing traffic adaptation. A base station apparatus can receive an uplink signal or transmit a downlink signal in a flexible subframe. In NPL 1, a mobile station apparatus regards the flexible subframe as a downlink subframe unless the mobile station apparatus is instructed to transmit an uplink signal in the flexible subframe by the base station apparatus. The traffic adaptation technique is also referred to as dynamic TDD.

NPL 1 discloses that a hybrid automatic repeat request (HARQ) timing for a physical downlink shared channel (PDSCH) is determined on the basis of an uplink-downlink configuration which is newly introduced, and that HARQ timing of a physical uplink shared channel (PUSCH) is determined on the basis of the initial UL-DL configuration.

NPL 2 discloses that (a) a UL/DL reference configuration is introduced, and (b) several subframes are scheduled to be used for either an uplink or a downlink through a dynamic grant/assignment from a scheduler.

In LTE release 10, a carrier aggregation technique is introduced in which a plurality of cells are set for a mobile station apparatus.

CITATION LIST

Non-Patent Document

NPL 1: "On standardization impact of TDD UL-DL adaptation", R1-122016, Ericsson, ST-Ericsson, 3GPP TSG-RAN WG1 Meeting #69, Prague, Czech Republic, 21 to 25 May 2012.

NPL 2: "Signaling support for dynamic TDD", R1-130558, Ericsson, ST-Ericsson, 3GPP TSG-RAN WG1 Meeting #72, St Julian's, Malta, 28 Jan. to 1 February 2013.

DISCLOSURE OF THE INVENTION

Problems to be Solved by the Invention

Throughput can be considerably improved in a case where the traffic adaptation technique is applied compared with a case where the ratio of an uplink resource and a downlink resource is not changed. However, a technique of performing discontinuous reception (DRX) has not been sufficiently examined in a radio communication system which employs the dynamic TDD.

The present invention has been made in consideration of the above circumstances, and an object thereof is to provide a terminal apparatus, a base station apparatus, an integrated circuit, and a radio communication method, capable of efficiently performing DRX in a radio communication system which employs dynamic TDD.

Means for Solving the Problems (1) In order to achieve the above-described object, the present invention provides the following means. In other words, according to the present invention, there is provided a terminal apparatus which performs a discontinuous reception process, including a setting unit that sets a first UL-DL configuration; and a reception unit that receives information indicating a second UL-DL configuration via a physical downlink control channel, and monitors a physical downlink control channel with a C-RNTI, during an active time based on a first subframe which is set as a downlink subframe or a subframe including a downlink pilot time slot (DwPTS) on the basis of the first UL-DL configuration, in a second subframe which is set as a downlink subframe or a subframe including a DwPTS on the basis of the second UL-DL configuration.

(2) In the terminal apparatus of the present invention, the active time includes a period in which a timer is running, and the timer is related to the number of the consecutive first subframes at beginning of a cycle of the discontinuous reception.

(3) In the terminal apparatus of the present invention, the timer starts at the beginning of the cycle of the discontinuous reception and expires on the basis of the number of the consecutive first subframes at the beginning of the cycle of the discontinuous reception.

(4) In the terminal apparatus of the present invention, a subframe which is set as an uplink subframe on the basis of the first UL-DL configuration is allowed to be set as an uplink subframe or a downlink subframe on the basis of the second UL-DL configuration.

(5) The terminal apparatus of the present invention further includes a transmission unit that transmits a HARQ-ACK. Here, the setting unit sets a third UL-DL configuration, the reception unit decodes a physical downlink shared channel corresponding to a physical downlink control channel with the C-RNTI in a subframe n on the basis of detection of the physical downlink control channel with the C-RNTI in the subframe n, the transmission unit transmits the HARQ-ACK of the physical downlink shared channel decoded in the subframe n, in a subframe n+k, and k is given on the basis of the third UL-DL configuration.

(6) In the terminal apparatus of the present invention, the transmission unit transmits a physical uplink shared channel corresponding to a physical downlink control channel with the C-RNTI in a subframe m+j on the basis of detection of the physical downlink control channel with the C-RNTI in a subframe m, and j is given on the basis of the first UL-DL configuration.

(7) In the terminal apparatus of the present invention, the setting unit sets a measurement gap, and, during the active time, in a case where a subframe, which is set as a downlink subframe or a subframe including a DwPTS on the basis of the second UL-DL configuration, is not part of the set measurement gap, the reception unit monitors the physical downlink control channel with the C-RNTI.

(8) In the terminal apparatus of the present invention, the first UL-DL configuration and the second UL-DL configuration are defined by a downlink subframe, an uplink subframe, and a subframe including a DwPTS in a frame.

(9) In the terminal apparatus of the present invention, the third UL-DL configuration is defined by a downlink subframe, an uplink subframe, and a subframe including a DwPTS in a frame.

(10) According to the present invention, there is provided a base station apparatus which communicates with a terminal apparatus performing a discontinuous reception process, the base station apparatus including a setting unit that sets a first UL-DL configuration in the terminal apparatus; and a transmission unit that transmits information indicating a second UL-DL configuration indicating a second subframe in which a physical downlink control channel with a C-RNTI is to be monitored during an active time based on a first subframe, via the physical downlink control channel, in which the first subframe is a subframe which is set as a downlink subframe or a subframe including a downlink pilot time slot (DwPTS) on the basis of the first UL-DL configuration, and in which the second subframe is a subframe which is set as a downlink subframe or a subframe including a DwPTS on the basis of the second UL-DL configuration.

(11) In the base station apparatus of the present invention, the active time is related to the number of the consecutive first subframes at the beginning of a cycle of the discontinuous reception.

(12) In the base station apparatus of the present invention, a subframe which is set as an uplink subframe on the basis of the first UL-DL configuration is allowed to be set as an uplink subframe or a downlink subframe on the basis of the second UL-DL configuration.

(13) The base station apparatus of the present invention further includes a reception unit that receives a HARQ-ACK. Here, the setting unit sets a third UL-DL configuration in the terminal apparatus, the transmission unit transmits a physical downlink control channel with the C-RNTI and a physical downlink shared channel corresponding to the physical downlink control channel with the C-RNTI in a subframe n, the reception unit receives a HARQ-ACK of the physical downlink shared channel transmitted in the subframe n, in a subframe n+k, and k is given on the basis of the third UL-DL configuration.

(14) In the base station apparatus of the present invention, the transmission unit transmits the physical downlink control channel with the C-RNTI in a subframe m, the reception unit receives a physical uplink shared channel corresponding to the physical downlink control channel with the C-RNTI in a subframe m+j, and j is given on the basis of the first UL-DL configuration.

(15) In the base station apparatus of the present invention, the first UL-DL configuration and the second UL-DL configuration are defined by a downlink subframe, an uplink subframe, and a subframe including a DwPTS in a frame.

(16) In the base station apparatus of the present invention, the third UL-DL configuration is defined by a downlink subframe, an uplink subframe, and a subframe including a DwPTS in a frame.

(17) According to the present invention, there is provided an integrated circuit mounted in a terminal apparatus which performs a discontinuous reception process, the integrated circuit causing the terminal apparatus to realize a series of functions including a function of setting a first UL-DL configuration; a function of receiving information indicating a second UL-DL configuration via a physical downlink control channel; and a function of monitoring a physical downlink control channel with a C-RNTI, during an active time based on a first subframe which is set as a downlink subframe or a subframe including a downlink pilot time slot (DwPTS) on the basis of the first UL-DL configuration, in a second subframe which is set as a downlink subframe or a subframe including a DwPTS on the basis of the second UL-DL configuration.

(18) According to the present invention, there is provided an integrated circuit mounted in a base station apparatus which communicates with a terminal apparatus performing a discontinuous reception process, the integrated circuit causing the base station apparatus to realize a series of functions including a function of setting a first UL-DL configuration in the terminal apparatus; and a function of transmitting information indicating a second UL-DL configuration indicating a second subframe in which a physical downlink control channel with a C-RNTI is to be monitored during an active time based on a first subframe, via the physical downlink control channel, in which the first subframe is a subframe which is set as a downlink subframe or a subframe including a downlink pilot time slot (DwPTS) on the basis of the first UL-DL configuration, and in which the second subframe is a subframe which is set as a downlink subframe or a subframe including a DwPTS on the basis of the second UL-DL configuration.

(19) According to the present invention, there is provided a radio communication method used for a terminal apparatus which performs a discontinuous reception process, the method including setting a first UL-DL configuration; receiving information indicating a second UL-DL configuration via a physical downlink control channel; and monitoring a physical downlink control channel with a C-RNTI, during an active time based on a first subframe which is set as a downlink subframe or a subframe including a downlink pilot time slot (DwPTS) on the basis of the first UL-DL configuration, in a second subframe which is set as a downlink subframe or a subframe including a DwPTS on the basis of the second UL-DL configuration.

(20) According to the present invention, there is provided a radio communication method used for a base station apparatus which communicates with a terminal apparatus performing a discontinuous reception process, the method including setting a first UL-DL configuration in the terminal apparatus; and transmitting information indicating a second UL-DL configuration indicating a second subframe in which a physical downlink control channel with a C-RNTI is to be monitored during an active time based on a first subframe, via the physical downlink control channel, in which the first subframe is a subframe which is set as a downlink subframe or a subframe including a downlink pilot time slot (DwPTS) on the basis of the first UL-DL configuration, and in which the second subframe is a subframe which is set as a downlink subframe or a subframe including a DwPTS on the basis of the second UL-DL configuration.

Effects of the Invention

According to the present invention, it is possible to efficiently perform DRX in a radio communication system which employs dynamic TDD.

BRIEF DESCRIPTION OF THE DRAWINGS

FIG. 9 is a table illustrating an example of an uplink-downlink configuration in the present embodiment.

FIG. 12 is a diagram illustrating a correspondence between a pair formed by the first uplink reference UL-DL configuration for the other serving cell (primary cell) and the first uplink reference UL-DL configuration for a serving cell (secondary cell), and the second uplink reference UL-DL configuration for the secondary cell in the present embodiment.

FIG. 14 is a diagram illustrating a correspondence between a pair formed by the first downlink reference UL-DL configuration for a primary cell and the first downlink reference UL-DL configuration for a secondary cell, and the second downlink reference UL-DL configuration for the secondary cell in the present embodiment.

FIG. 15 is a diagram illustrating a relationship between a subframe indicated by the first uplink reference UL-DL configuration and a subframe indicated by the first downlink reference UL-DL configuration in the present embodiment.

FIG. 16 is a diagram illustrating a relationship between a subframe indicated by the first uplink reference UL-DL configuration, a subframe indicated by the first downlink reference UL-DL configuration, and a subframe indicated by a transmission direction UL-DL configuration in the present embodiment.

FIG. 17 is a diagram illustrating a relationship between the first uplink reference UL-DL configuration, the first downlink reference UL-DL configuration, and the transmission direction UL-DL configuration, in the present embodiment.

FIG. 18 is a diagram illustrating a correspondence between a subframe n in which PDCCH/EPDCCH/PHICH is allocated, and a subframe n+k in which a PUSCH corresponding to the PDCCH/EPDCCH/PHICH is allocated, in the present embodiment.

FIG. 19 is a diagram illustrating a correspondence between a subframe n in which a PHICH is allocated, and a subframe n−k in which a PUSCH corresponding to the PHICH is allocated, in the present embodiment.

FIG. 20 is a diagram illustrating a correspondence between a subframe n in which a PUSCH is allocated, and a subframe n+k in which a PHICH corresponding to the PUSCH is allocated, in the present embodiment. The mobile station apparatus 1 specifies (selects, determines) the value of k according to the table of FIG. 20.

FIG. 21 is a diagram illustrating a correspondence between a subframe n−k in which a PDSCH is allocated, and a subframe n in which a HARQ-ACK corresponding to the PDSCH is transmitted, in the present embodiment.

FIG. 25 is a diagram illustrating an example of a PDCCH subframe in a first embodiment of the present invention.

FIG. 26 is a diagram illustrating an example of a PDCCH subframe in the first embodiment of the present invention.

FIG. 27 is a diagram illustrating an example of a PDCCH subframe in the first embodiment of the present invention.

FIG. 28 is a diagram illustrating an example of a DRX operation in the first embodiment of the present invention.

FIG. 29 is a diagram illustrating an example of a PDCCH subframe in a second embodiment of the present invention.

FIG. 30 is a diagram illustrating an example of a PDCCH subframe in the second embodiment of the present invention.

FIG. 31 is a diagram illustrating an example of a PDCCH subframe in the second embodiment of the present invention.

FIG. 32 is a diagram illustrating an example of a PDCCH subframe in a third embodiment of the present invention.

FIG. 33 is a diagram illustrating an example of a PDCCH subframe in the third embodiment of the present invention.

FIG. 34 is a diagram illustrating an example of a PDCCH subframe in the third embodiment of the present invention.

MODE FOR CARRYING OUT THE INVENTION

Figure 1:
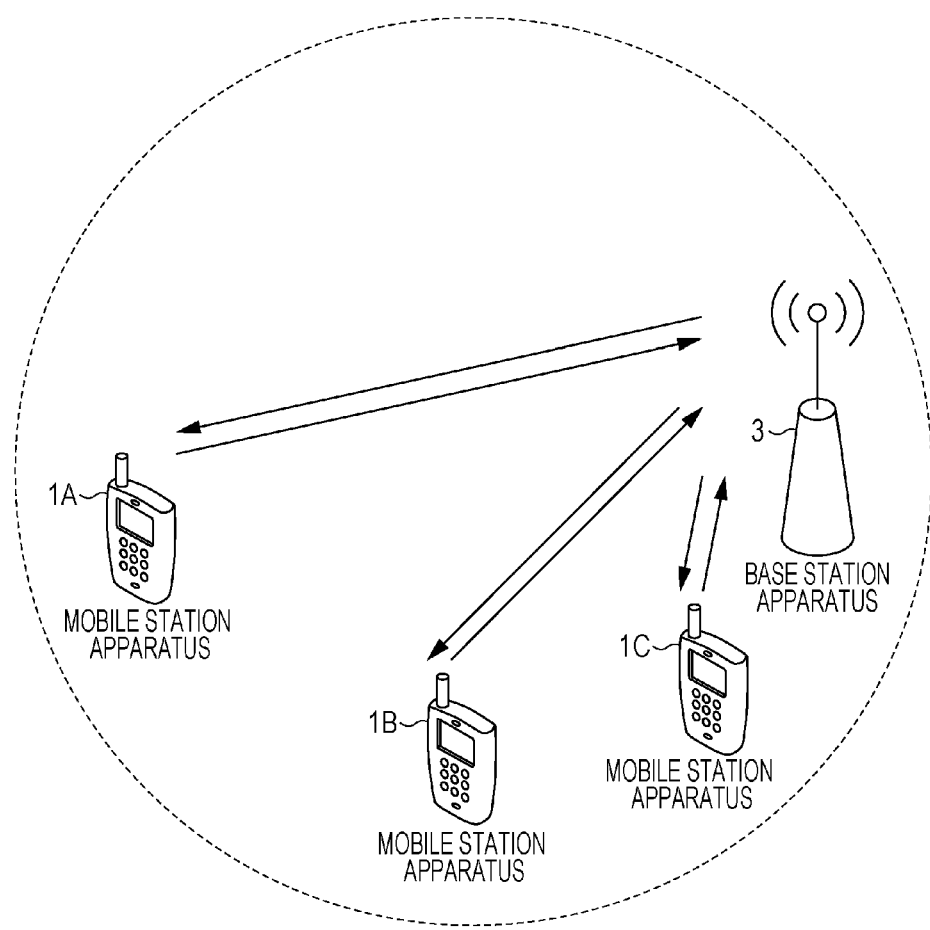
FIG. 1 is a conceptual diagram of a radio communication system of the present embodiment.

Hereinafter, embodiments of the present invention will be described.

In the present embodiment, a plurality of cells are set for a mobile station apparatus. A technique in which the mobile station apparatus performs communication via the plurality of cells is referred to as cell aggregation or carrier aggregation. The present invention may be applied to each of the plurality of cells set for the mobile station apparatus. In addition, the present invention may be applied to some of the plurality of set cells. The cell set for the mobile station apparatus is also referred to as a serving cell.

The plurality of set serving cells includes a single primary cell and one or a plurality of secondary cells. The primary cell is a serving cell on which an initial connection establishment procedure is performed, a serving cell on which a connection reestablishment procedure is started, or a cell which is indicated as a primary cell in a handover procedure. The secondary cell may be set when or after RRC connection is established.

A radio communication system of the present embodiment employs a time division duplex (TDD) method. In a case of cell aggregation, the TDD method may be applied to all of a plurality of cells or some of the cells.

In a case where a plurality of cells to which the TDD is applied are aggregated, a half-duplex TDD method or a full-duplex TDD method is applied thereto.

In the half-duplex TDD method, a mobile station apparatus cannot simultaneously perform uplink transmission and downlink reception in the plurality of cells to which the TDD is applied. In a case of the half-duplex TDD, the mobile station apparatus does not simultaneously perform transmission and reception in a single primary cell in a certain band, or in a single primary cell and one or a plurality of secondary cells in a plurality of different bands.

In the full-duplex TDD method, the mobile station apparatus can simultaneously perform uplink transmission and downlink reception in a plurality of cells to which the TDD is applied. In a case of the full-duplex TDD, the mobile station apparatus can simultaneously perform transmission and reception in a plurality of serving cells in a plurality of different bands.

The mobile station apparatus transmits information indicating combinations of bands in which carrier aggregation is supported by the mobile station apparatus, to a base station apparatus. The mobile station apparatus transmits, to the base station apparatus, information indicating whether or not simultaneous transmission and reception in the plurality of serving cells in a plurality of different bands is supported in each of the combinations of bands.

In a case where a cell to which the TDD is applied and a cell to which frequency division duplex (FDD) is applied are aggregated, the present invention is applicable to the cell to which the TDD is applied.

In the present embodiment, "X/Y" indicates "X or Y". In the present embodiment, "X/Y" indicates "X and Y". In the present embodiment, "X/Y" indicates "X and/or Y".

FIG. 1 is a conceptual diagram of a radio communication system of the present embodiment. In FIG. 1, the radio communication system includes mobile station apparatuses 1A to 1C, and a base station apparatus 3. Hereinafter, the mobile station apparatuses 1A to 1C are referred to as a "mobile station apparatus 1".

A physical channel and a physical signal of the present embodiment will be described.

In FIG. 1, the following uplink physical channels are used for uplink radio communication from the mobile station apparatus 1 to the base station apparatus 3. The uplink physical channels are used to transmit information which is output from a higher layer.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of downlink, a scheduling request (SR) indicating a request for a PUSCH resource, and acknowledgement (ACK)/negative ACK (NACK) for downlink data (transport block, downlink-shared channel: DL-SCH). The ACK/NACK is also referred to as a HARQ-ACK, HARQ feedback, or response information.

The PUSCH is a physical channel used to transmit uplink data (uplink-shared channel: UL-SCH). In addition, the PUSCH may be used to transmit the HARQ-ACK and/or the channel state information along with the uplink data. Further, the PUSCH may be used to transmit only the channel state information, or only the HARQ-ACK and the channel state information.

The PRACH is a physical channel used to transmit a random access preamble. The PRACH is mainly used for the mobile station apparatus 1 to be synchronized with the base station apparatus 3 in a time domain. In addition, the PRACH is also used to indicate synchronization (timing adjustment) with an initial connection establishment procedure, a handover procedure, a connection reestablishment procedure, and uplink transmission, and to indicate a request for a PUSCH resource.

In FIG. 1, the following uplink physical signal is used for the uplink radio communication. The uplink physical signal is not used to transmit information output from a high layer but is used by a physical layer.

Uplink reference signal (UL RS)

In the present embodiment, the following two types of uplink reference signals are used.

Demodulation reference signal (DMRS)
Sounding reference signal (SRS)

The DMRS is related to transmission of the PUSCH or the PUCCH. The DMRS is subject to time division multiplexing with the PUSCH or the PUCCH. The base station apparatus 3 uses the DMRS to perform channel correction of the PUSCH or the PUCCH. Hereinafter, transmission of both the PUSCH and the DMRS is simply referred to transmission of the PUSCH. Hereinafter, transmission of both the PUCCH and the DMRS is simply referred to transmission of the PUCCH.

The SRS is not related to transmission of the PUSCH or the PUCCH. The base station apparatus 3 uses the SRS to measure an uplink channel state. The mobile station apparatus 1 transmits a first SRS in a first resource which is set by a high layer. In addition, in a case where information indicating a request for transmitting the SRS is received via a PDCCH, the mobile station apparatus 1 transmits a second SRS only once in a second resource which is set by the high layer. The first SRS is also referred to as a periodic SRS. The second SRS is also referred to as an aperiodic SRS.

In FIG. 1, the following downlink physical channels are used for downlink radio communication from the base station apparatus 3 to the mobile station apparatus 1. The downlink physical channels are used to transmit information output from a high layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)

The PBCH is used to send notification of a master information block (MIB, or broadcast channel: BCH) which is used in common by the mobile station apparatuses 1. The MIB is transmitted at intervals of 40 ms, and the MIB is repeatedly transmitted with periodicity of 10 ms. Specifically, initial transmission of the MIB is performed in a subframe 0 of a radio frame satisfying SFN mod 4=0, and retransmission (repetition) of the MIB is performed in subframes 0 of all other radio frames. The SFN (system frame number) is a radio frame number. The MIB is system information. For example, the MIB includes information indicating the SFN.

The PCFICH is used to transmit information indicating a region (OFDM symbol) which is used to transmit the PDCCH.

The PHICH is used to transmit a HARQ indicator (HARQ feedback or response information) indicating an acknowledgement (ACK) or negative acknowledgement (NACK) of uplink data (uplink shared channel: UL-SCH) received by the base station apparatus 3. For example, in a case where a HARQ indicator indicating an ACK is received, the mobile station apparatus 1 does not retransmit corresponding uplink data. For example, in a case where a HARQ indicator indicating a NACK is received, the mobile station apparatus 1 retransmits corresponding uplink data. A single PHICH transmits a HARQ indicator for a single item of uplink data. The base station apparatus 3 transmits respective HARQ indicators for a plurality of uplink data items included in the same PUSCH, by using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH in a single cell. The downlink grant is used for scheduling of a PDSCH in the same subframe as a subframe in which the downlink grant is transmitted. The uplink grant is used for scheduling a single PUSCH in a single cell. The uplink grant is used for scheduling a single PUSCH in a subframe which occurs four or more subframes later than a subframe in which the uplink grant is transmitted.

A cyclic redundancy check (CRC) parity bit is added to the DCI format. The CRC parity bit is scrambled with a cell-radio network temporary identifier (C-RNTI), or a semi-persistent scheduling cell-radio network temporary identifier (SPS C-RNTI). The C-RNTI and the SPS C-RNTI are identifiers for identifying a mobile station apparatus in a cell.

The C-RNTI is used to control the PDSCH or the PUSCH in a single subframe. The SPS C-RNTI is used to periodically allocate a PDSCH or PUSCH resource.

The PDSCH is used to transmit downlink data (downlink shared channel: DL-SCH).

In FIG. 1, the following downlink physical signals are used for the downlink radio communication. The downlink physical signals are not used to transmit information output from a high layer but are used by a physical layer.

Synchronization signal (SS)
Downlink reference signal (DL RS)

The synchronization signal is used for the mobile station apparatus 1 to perform synchronization of a frequency domain and a time domain of downlink. In the TDD method, the synchronization signal is mapped in subframes 0, 1, 5 and 6 of a radio frame. In the FDD method, the synchronization signal is mapped in subframes 0 and 5 of a radio frame.

The downlink reference signal is used for the mobile station apparatus 1 to perform channel correction of the downlink physical channel. The downlink reference signal is used for the mobile station apparatus 1 to calculate channel state information of a downlink.

In the present embodiment, the following five types of downlink reference signals are used.

Cell-specific reference signal (CRS)
UE-specific reference signal (URS) related to a PDSCH
Demodulation reference signal (DMRS) related to an EPDCCH
Non-zero power channel state information—reference signal (NZP CSI-RS)
Zero power channel state information—reference signal (ZP CSI-RS)

The CRS is transmitted with all subframes. The CRS is used to demodulate PBCH/PDCCH/PHICH/PCFICH/PDSCH. The CRS may be used for the mobile station apparatus 1 to calculate channel state information of a downlink. The PBCH/PDCCH/PHICH/PCFICH are (is) transmitted via an antenna port which is used to transmit the CRS.

The URS related to a PDSCH is transmitted with a subframe and a band which are used to transmit the PDSCH to which the URS is related. The URS is used to demodulate a PDSCH to which the URS is related.

The PDSCH is transmitted via an antenna port which is used to transmit a CRS or a URS. A DCI format 1A is used for scheduling a PDSCH which is transmitted via an antenna port used to transmit a CRS. A DCI format 2D is used for scheduling a PDSCH which is transmitted via an antenna port used to transmit a URS.

The DMRS related to an EPDCCH is transmitted with a subframe and a band which are used to transmit the EPDCCH to which the DMRS is related. The DMRS is used to demodulate an EPDCCH to which the DMRS is related. The EPDCCH is transmitted via an antenna port which is used to transmit the DMRS.

The NZP CSI-RS is transmitted in a set subframe. A resource in which the NZP CSI-RS is transmitted is set by the base station apparatus. The NZP CSI-RS is used for the mobile station apparatus 1 to calculate channel state information of a downlink.

A resource of the ZP CSI-RS is set by the base station apparatus. The base station apparatus transmits the ZP CSI-RS with zero output. In other words, the base station apparatus does not transmit the ZP CSI-RS. The base station apparatus does not transmit a PDSCH and an EPDCCH in a set resource of the ZP CSI-RS. For example, the mobile station apparatus 1 can measure interference in a resource corresponding to the NZP CSI-RS in a certain cell.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to a physical signal.

The BCH, the UL-SCH and the DL-SCH are transport channels. A channel used by a medium access control (MAC) layer is referred to as a transport channel. The unit of the transport channel used by the MAC layer is referred to as a transport block (TB) or a MAC protocol data unit (PDU). In the MAC layer, control of a hybrid automatic repeat request (HARQ) is performed on each transport block. The transport block is the unit of data which is delivered to a physical layer by the MAC layer. In the physical layer, the transport block is mapped to a codeword, and a coding process is performed on each codeword.

Hereinafter, a configuration of the radio frame of the present embodiment will be described.

Figure 2:
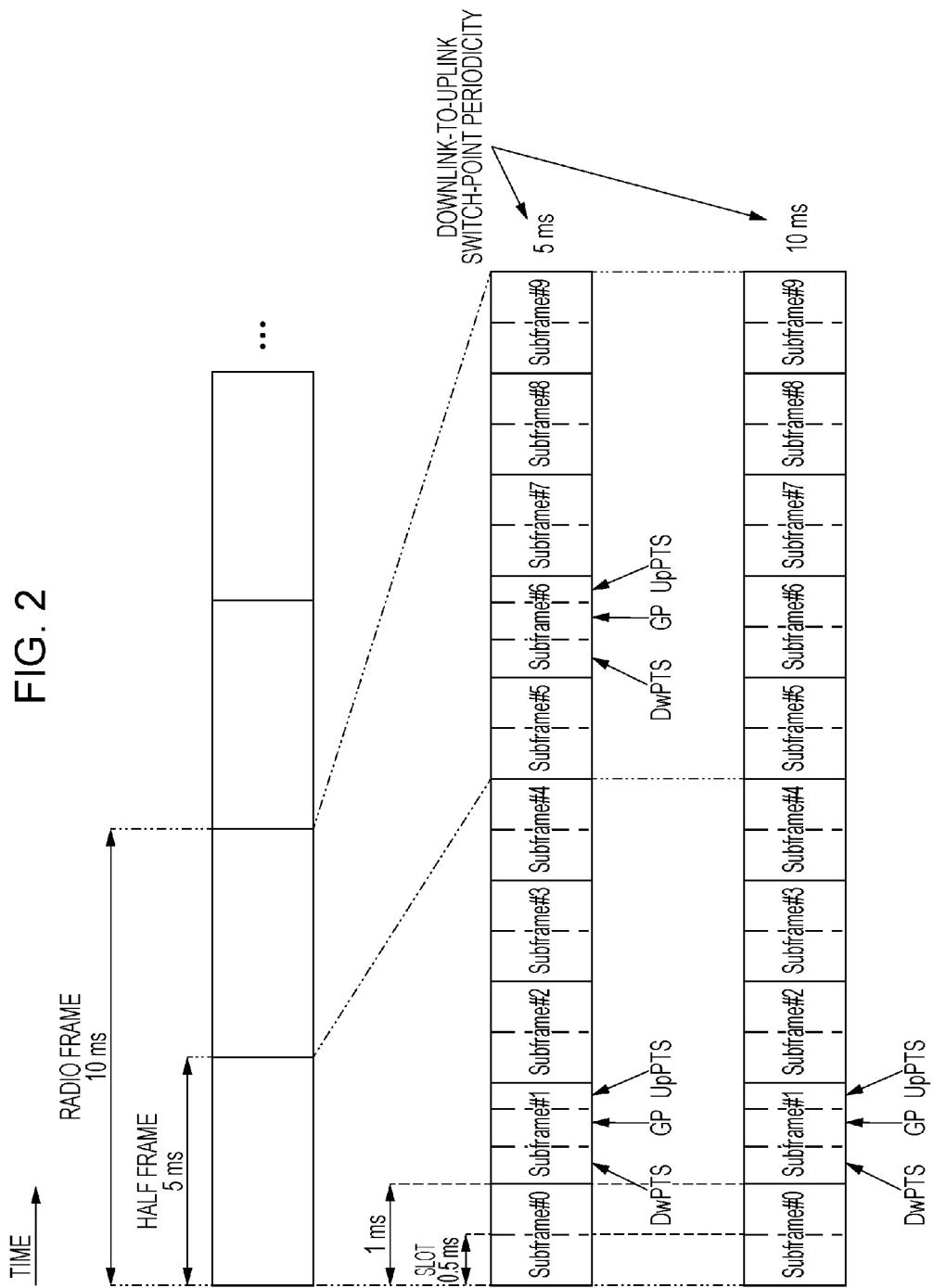
FIG. 2 is a diagram illustrating a schematic configuration of a radio frame of the present embodiment.

FIG. 2 is a diagram illustrating a schematic configuration of the radio frame of the present embodiment. Each radio frame has a length of 10 ms. In FIG. 2, a transverse axis is a time axis. In addition, each radio frame is constituted by two half frames. Each of the half frames has a length of 5 ms. Each of the half frames is constituted by five subframes. Each of the subframes has a length of 1 ms and is defined by two continuous slots. Each of the slots has a length of 0.5 ms. An i-th subframe of the radio frame is constituted by a (2×i)-th slot and a (2×i+1)-th slot. In other words, ten subframes can be used at intervals of 10 ms.

In the present embodiment, the following three types of subframes are defined.

Downlink subframe (first subframe)
Uplink subframe (second subframe)
Special subframe (third subframe)

The downlink subframe is a subframe which is reserved for downlink transmission. The uplink subframe is a subframe which is reserved for uplink transmission. The special subframe is constituted by three fields. The three fields are a downlink pilot time slot (DwPTS), a guard period (GP), and an uplink pilot time slot (UpPTS). A total length of the DwPTS, the GP, and the UpPTS is 1 ms. The DwPTS is a field which is reserved for downlink transmission. The UpPTS is a field which is reserved for uplink transmission. The GP is a field in which downlink transmission and uplink transmission are not performed. In addition, the special subframe may consist of only the DwPTS and GP, and may consist of only the GP and the UpPTS.

A single radio frame is constituted by at least a downlink subframe, an uplink subframe, and a special subframe.

The radio communication system of the present embodiment supports the downlink-to-uplink switch-point periodicities of 5 ms and 10 ms. In a case where the downlink-to-uplink switch-point periodicity is 5 ms, a special subframe is included in both half frames of the radio frame. In a case where the downlink-to-uplink switch-point periodicity is 10 ms, a special subframe is included only in the first half frame of the radio frame.

Hereinafter, a configuration of the slot of the present embodiment will be described.

Figure 3:
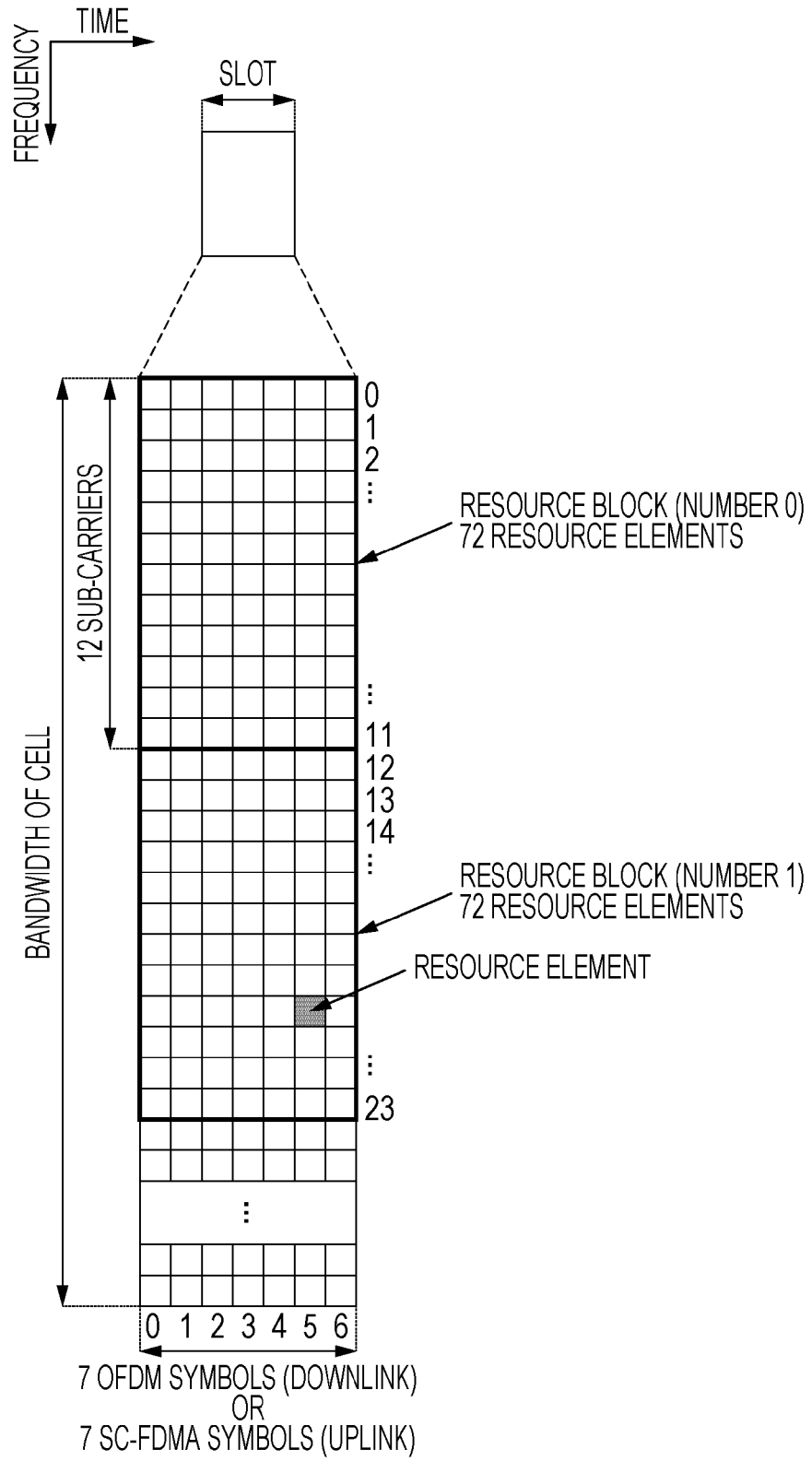
FIG. 3 is a diagram illustrating a configuration of a slot of the present embodiment.

FIG. 3 is a diagram illustrating a configuration of the slot of the present embodiment. A physical signal or a physical channel transmitted in each slot is expressed by a resource grid. In FIG. 3, a transverse axis is a time axis, and a longitudinal axis is a frequency axis. In a downlink, the resource grid is defined by a plurality of subcarriers and a plurality of OFDM symbols. In an uplink, the resource grid is defined by a plurality of subcarriers and a plurality of SC-FDMA symbols. The number of subcarriers forming a single slot depends on a bandwidth of a cell. The number of OFDM symbols or SC-FDMA symbols forming a single slot is seven. Each of elements of the resource grid is referred to as a resource element. The resource element is identified by using a subcarrier number and an OFDM symbol number or an SC-FDMA symbol number.

A resource block is used to express mapping of a certain physical channel (a PDSCH, a PUSCH, or the like) to a resource element. The resource block includes a virtual resource block and a physical resource block. A certain physical channel is first mapped to the virtual resource block. Then, the virtual resource block is mapped to the physical resource block. A single physical resource block is defined by seven continuous OFDM symbols or SC-FDMA symbols in the time domain, and twelve contiguous subcarriers in the frequency domain. Therefore, a single physical resource block is constituted by (7×12) resource elements. In addition, a single physical resource block corresponds to a single slot in the time domain and corresponds to 180 kHz in the frequency domain. The physical resource block may be numbered from 0 in the frequency domain.

Hereinafter, a description will be made of a physical channel and a physical signal transmitted in each subframe.

Figure 4:
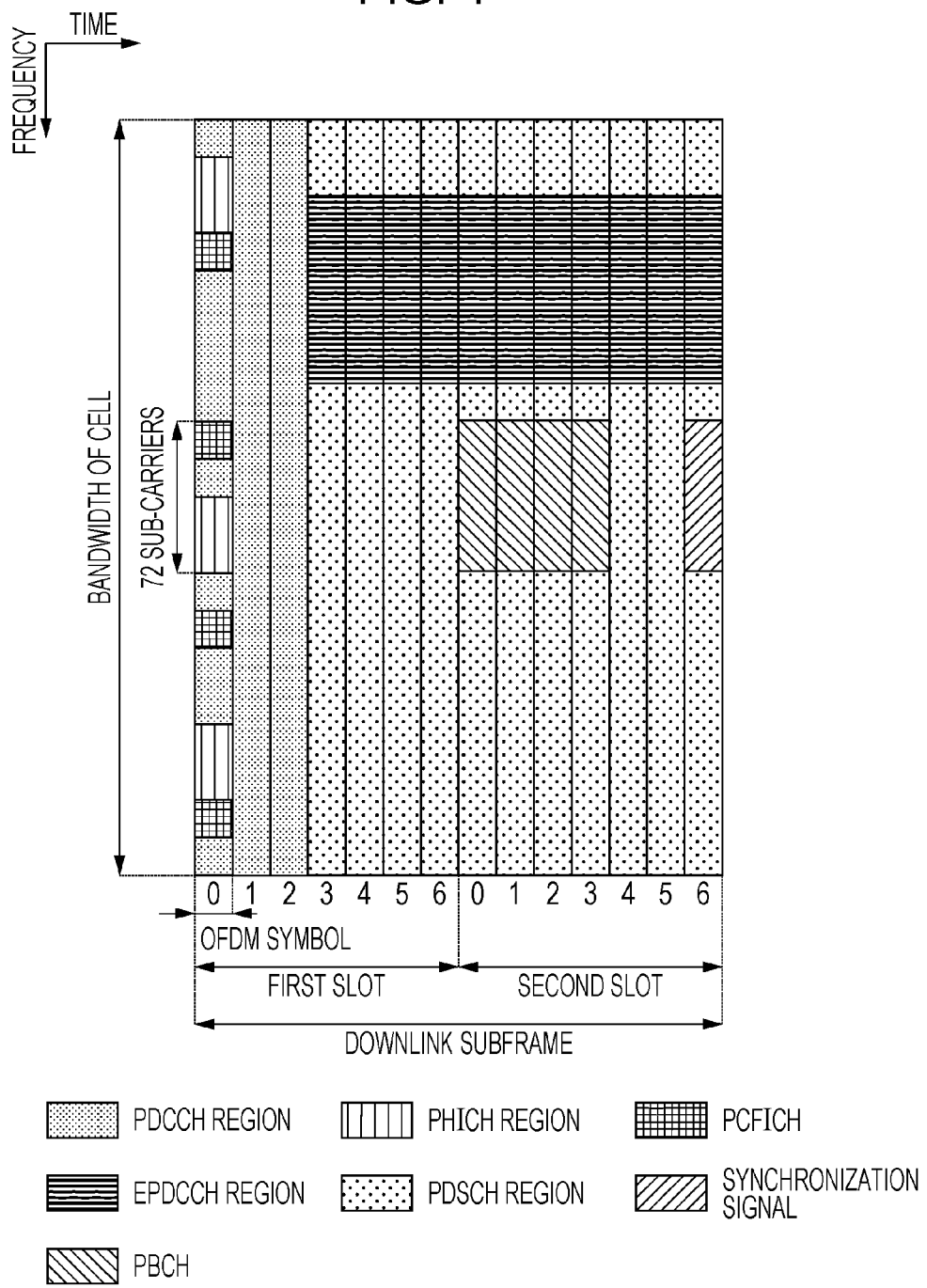
FIG. 4 is a diagram illustrating an example in which a physical channel and a physical signal are mapped in a downlink subframe of the present embodiment.

FIG. 4 is a diagram illustrating an example of an arrangement of physical channels and physical signals in a downlink subframe of the present embodiment. In FIG. 4, a transverse axis is a time axis, and a longitudinal axis is a frequency axis. The base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. In addition, the PBCH is transmitted only in the subframe 0 of the radio frame. Further, the downlink reference signal is mapped in resource elements which are distributed in the frequency domain and the time domain. For simplification of description, the downlink reference signal is not illustrated in FIG. 4.

In a PDCCH region, a plurality of PDCCHs may be subject to frequency and time multiplexing. In an EPDCCH region, a plurality of EPDCCHs may be subject to frequency and time multiplexing. In a PDSCH region, a plurality of PDSCHs may be subject to frequency and time multiplexing. The PDCCH and the PDSCH or the EPDCCH may be subject to time multiplexing. The PDSCH and the EPDCCH may be subject to frequency multiplexing.

Figure 5:
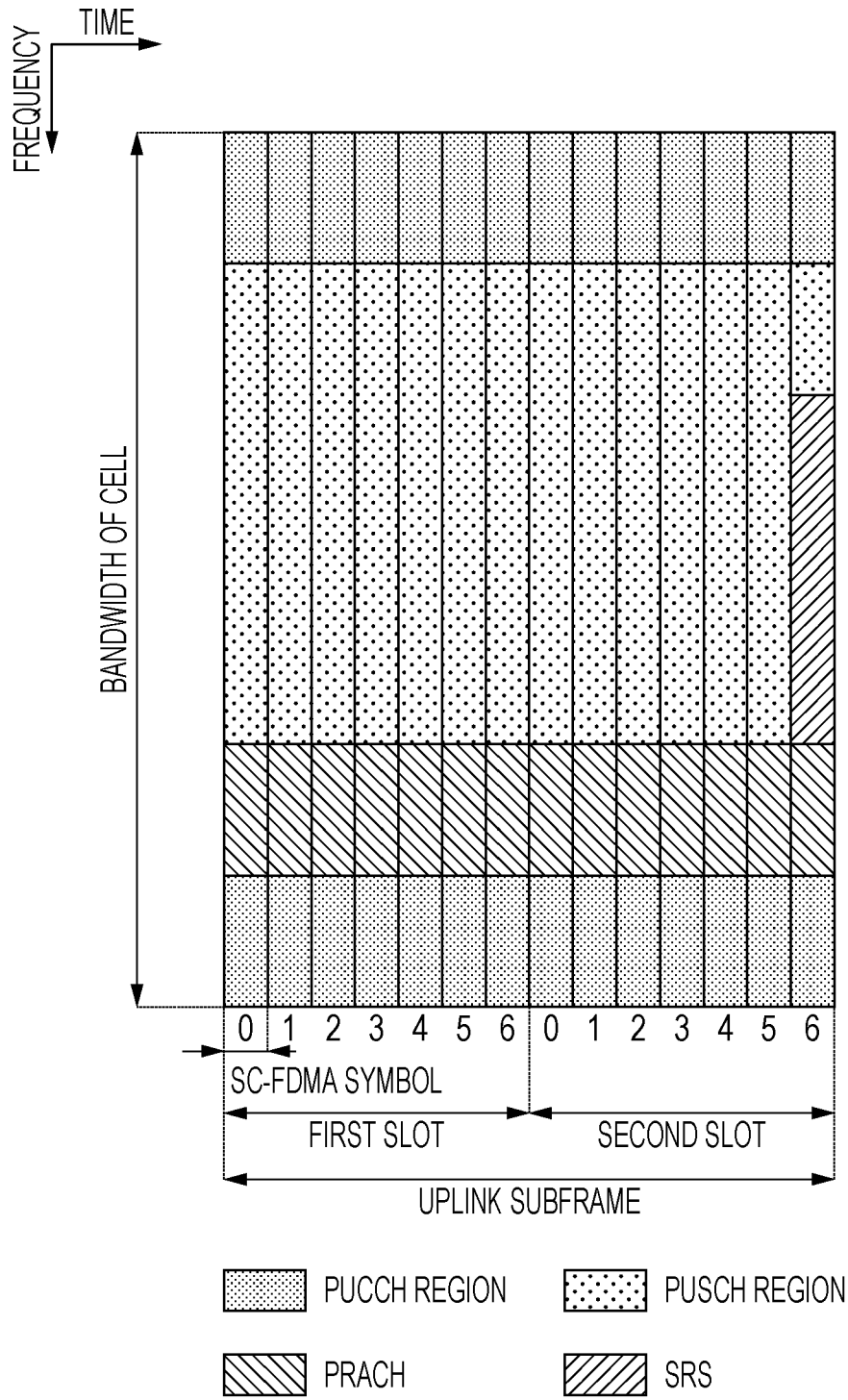
FIG. 5 is a diagram illustrating an example in which a physical channel and a physical signal are mapped in an uplink subframe of the present embodiment.

FIG. 5 is a diagram illustrating an example of an arrangement of physical channels and physical signals in an uplink subframe of the present embodiment. In FIG. 5, a transverse axis is a time axis, and a longitudinal axis is a frequency axis. The mobile station apparatus 1 may transmit the uplink physical channels (the PUCCH, the PUSCH, and the PRACH) and the uplink physical signals (the DMRS and the SRS) in the uplink subframe. In a PUCCH region, a plurality of PUCCHs may be subject to frequency, time and code multiplexing. In a PUSCH region, a plurality of PUSCHs may be subject to frequency and spatial multiplexing. The PUCCH and the PUSCH may be subject to frequency multiplexing. The PRACH may be allocated in a single subframe or across two subframes. In addition, a plurality of PRACHs may be subject to code multiplexing.

The SRS is transmitted by using the last SC-FDMA symbol of the uplink subframe. In other words, the SRS is mapped in the last SC-FDMA symbol of the uplink subframe. The mobile station apparatus 1 cannot simultaneously transmit the SRS and the PUCCH/PUSCH/PRACH in a single SC-FDMA symbol of a single cell. In a single uplink subframe of a single cell, the mobile station apparatus 1 can transmit the PUSCH and/or the PUCCH by using SC-FDMA symbols excluding the last SC-FDMA symbol of the uplink subframe, and can transmit the SRS by using the last SC-FDMA symbol of the uplink subframe. In other words, in the single uplink subframe of the single cell, the mobile station apparatus 1 can transmit both the SRS and the PUSCH/PUCCH. In addition, the DMRS is subject to time multiplexing with the PUCCH or the PUSCH. For simplification of description, the DMRS is not illustrated in FIG. 5.

Figure 6:
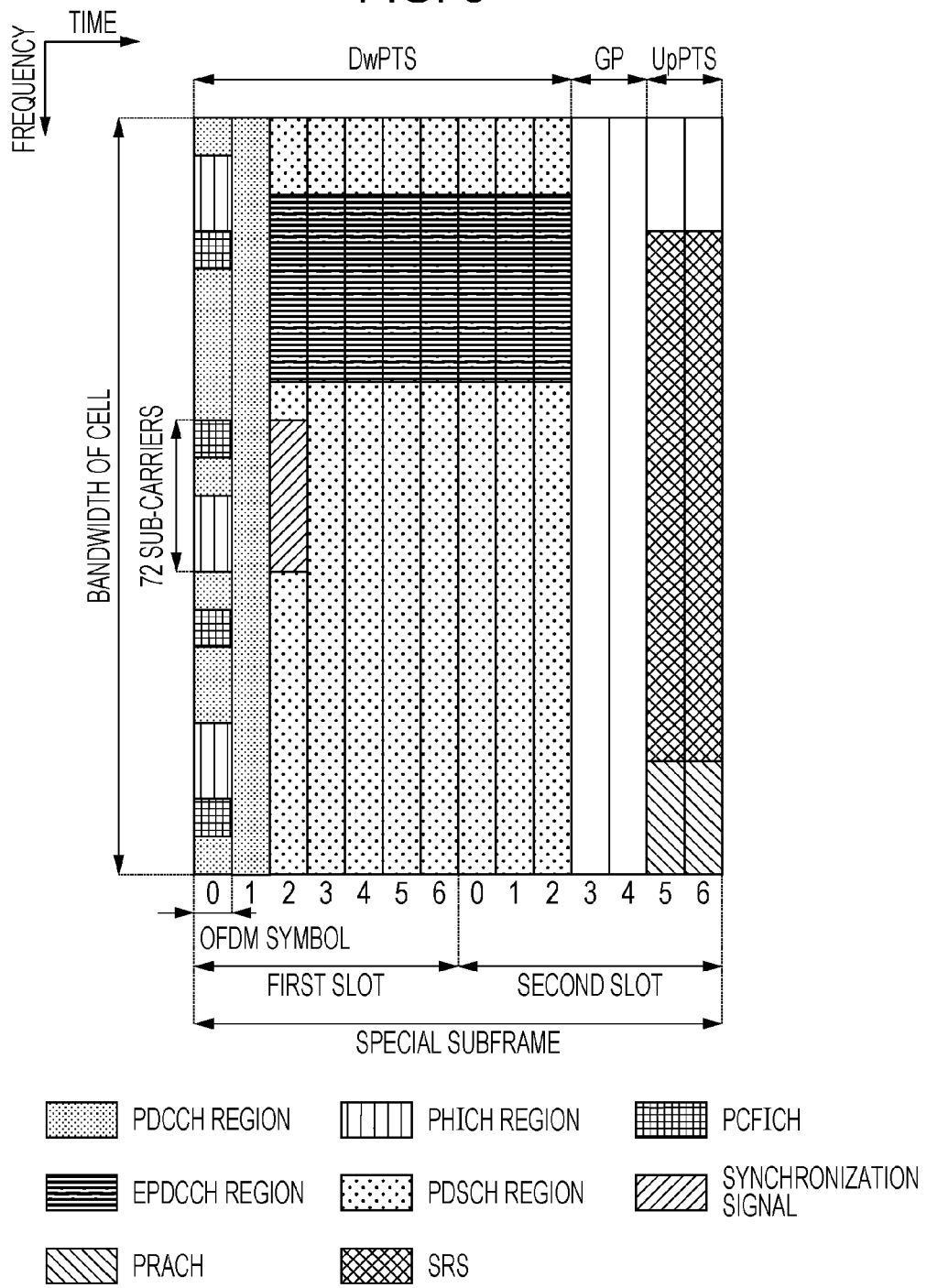
FIG. 6 is a diagram illustrating an example in which a physical channel and a physical signal are mapped in a special subframe of the present embodiment.

FIG. 6 is a diagram illustrating an example of an arrangement of physical channels and physical signals in a special subframe of the present embodiment. In FIG. 6, a transverse axis is a time axis, and a longitudinal axis is a frequency axis. In FIG. 6, the DwPTs is constituted by the first to ninth SC-FDMA symbols of the special subframe, the GP is constituted by the tenth to twelfth SC-FDMA symbols of the special subframe, and the UpPTS is constituted by the thirteenth and fourteenth SC-FDMA symbols of the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The mobile station apparatus 1 may transmit the PRACH and the SRS in the UpPTS of the special subframe. In other words, the mobile station apparatus 1 does not transmit the PUCCH, the PUSCH, and the DMRS in the UpPTS of the special subframe.

Figure 7:
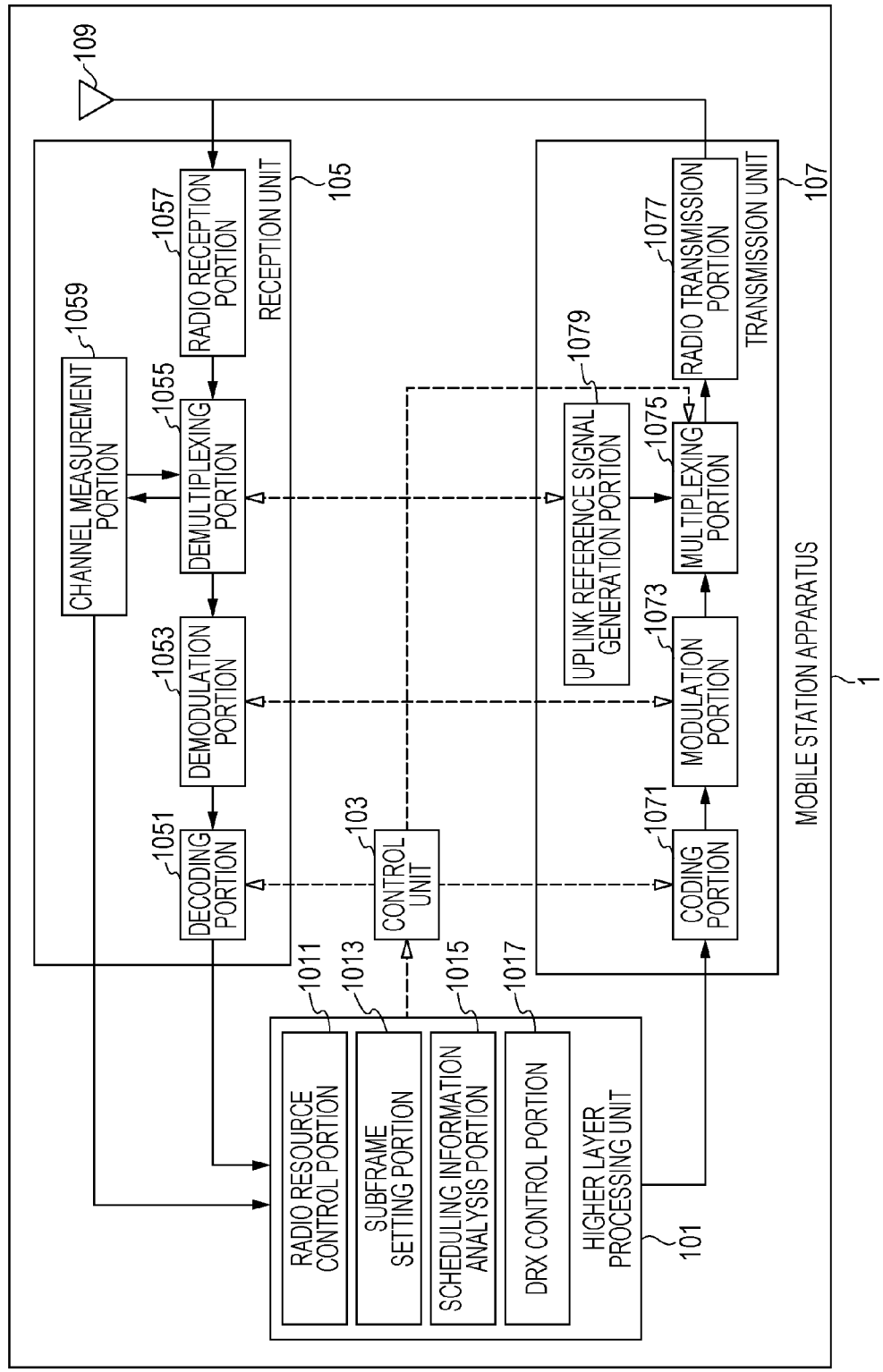
FIG. 7 is a schematic block diagram illustrating a configuration of a mobile station apparatus 1 of the present embodiment.

FIG. 7 is a schematic block diagram illustrating a configuration of the mobile station apparatus 1 according to the present embodiment. As illustrated in FIG. 7, the mobile station apparatus 1 includes a higher layer processing unit 101, a control unit 103, a reception unit 105, a transmission unit 107, and a transmit and receive antenna 109. In addition, the higher layer processing unit 101 includes a radio resource control portion 1011, a subframe setting portion 1013, a scheduling information analysis portion 1015, and a discontinuous reception (DRX) control portion 1017. Further, the reception unit 105 includes a decoding portion 1051, a demodulation portion 1053, a demultiplexing portion 1055, a radio reception portion 1057, and a channel measurement portion 1059. Furthermore, the transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) which is generated through a user's operation or the like, to the transmission unit 107. In addition, the higher layer processing unit 101 performs processes on a medium access control (MAC) layer, a packet data convergence protocol (PDCP) layer, a radio link control (RLC) layer, and a radio resource control (RRC) layer.

The radio resource control portion 1011 of the higher layer processing unit 101 manages various items of setting information of the terminal. In addition, the radio resource control portion 1011 generates information which is to be mapped in each channel of an uplink, and outputs the information to the transmission unit 107.

The subframe setting portion 1013 of the higher layer processing unit 101 manages a first uplink reference UL-DL configuration, a first downlink reference UL-DL configuration, a second uplink reference UL-DL configuration, a second downlink reference UL-DL configuration, and a transmission direction UL-DL configuration.

The subframe setting portion 1013 sets the first uplink reference UL-DL configuration, the first downlink reference UL-DL configuration, the second uplink reference UL-DL configuration, the second downlink reference UL-DL configuration, and the transmission direction UL-DL configuration.

The scheduling information analysis portion 1015 of the higher layer processing unit 101 analyzes a DCI format (scheduling information) which is received via the reception unit 105, generates control information for controlling the reception unit 105 and the transmission unit 107 on the basis of a result of analyzing the DCI format, and outputs the control information to the control unit 103.

The scheduling information analysis portion 1015 also determines timings for performing a transmission process and a reception process on the basis of the first uplink reference UL-DL configuration, the first downlink reference UL-DL configuration, the second uplink reference UL-DL configuration, the second downlink reference UL-DL configuration, and/or the transmission direction UL-DL configuration.

The DRX control portion 1017 specifies (selects, determines) a PDCCH subframe on the basis of the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control portion 1017 performs a DRX process on the basis of the PDCCH subframe. The DRX control portion 1017 manages a timer related to the DRX on the basis of the PDCCH subframe.

The DRX control portion 1017 instructs the reception unit 105 to monitor the PDCCH/EPDCCH in the subframe.

The control unit 103 generates control signals for controlling the reception unit 105 and the transmission unit 107 on the basis of the control information from the higher layer processing unit 101. The control unit 103 outputs the generated control signals to the reception unit 105 and the transmission unit 107 so as to control the reception unit 105 and the transmission unit 107.

The reception unit 105 demultiplexes, demodulates and decodes a received signal which is received from the base station apparatus 3 via the transmit and receive antenna 109, in response to the control signal which is input from the control unit 103, and outputs the decoded information to the higher layer processing unit 101.

The radio reception portion 1057 converts (down-converts) a downlink signal which is received via the transmit and receive antenna 109 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal. The radio reception portion 1057 removes a portion corresponding to a guard interval (GI) from the converted digital signal, and performs fast Fourier transform (FFT) on the signal from which the guard interval is removed, so as to extract a signal of the frequency domain.

The demultiplexing portion 1055 demultiplexes the extracted signal into the PHICH, the PDCCH, the EPDCCH, the PDSCH, and the downlink reference signal. Further, the demultiplexing portion 1055 compensates for channels such as the PHICH, the PDCCH, the EPDCCH, and the PDSCH on the basis of channel estimation values which are input from the channel measurement portion 1059. Furthermore, the demultiplexing portion 1055 outputs the demultiplexed downlink reference signal to the channel measurement portion 1059.

The demodulation portion 1053 multiplies and combines the PHICH by and with a corresponding sign, demodulates the combined signal in a binary phase shift keying (BPSK) modulation method, and outputs an obtained signal to the decoding portion 1051. The decoding portion 1051 decodes the PHICH directed to the mobile station apparatus, and outputs a decoded HARQ indicator to the higher layer processing unit 101. The demodulation portion 1053 demodulates the PDCCH and/or the EPDCCH in a QPSK modulation method, and outputs an obtained result to the decoding portion 1051. In a case where the decoding portion 1051 tries to decode the PDCCH and/or the EPDCCH and succeeds in the decoding, the decoding portion outputs decoded downlink control information and RNTI corresponding to the downlink control information to the higher layer processing unit 101.

The demodulation portion 1053 demodulates the PDSCH in a modulation method such as quadrature phase shift keying (QPSK), 16 quadrature amplitude modulation (QAM), or 64 QAM, of which a notification is sent in a downlink grant, and outputs an obtained result to the decoding portion 1051. The decoding portion 1051 performs decoding on the basis of information regarding a coding rate of which a notification has been sent with the downlink control information, and outputs decoded downlink data (transport block) to the higher layer processing unit 101.

The channel measurement portion 1059 measures a path loss of a downlink or a channel state on the basis of the downlink reference signal which is input from the demultiplexing portion 1055, and outputs the measured path loss or channel state to the higher layer processing unit 101. In addition, the channel measurement portion 1059 calculates a channel estimation value of the downlink on the basis of the downlink reference signal, and outputs the estimation value to the demultiplexing portion 1055.

The transmission unit 107 generates an uplink reference signal in response to the control signal which is input from the control unit 103, codes and modulates uplink data (transport block) which is input from the higher layer processing unit 101, multiplexes the PUCCH, the PUSCH, and the generated uplink reference signal, and transmits the obtained result to the base station apparatus 3 via the transmit and receive antenna 109.

The coding portion 1071 performs coding such as convolutional coding or block coding on the uplink control information which is input from the higher layer processing unit 101. In addition, the coding portion 1071 performs turbo coding on the basis of information used for scheduling the PUSCH.

The modulation portion 1073 modulates the coded bits which are input from the coding portion 1071 in a modulation method such as BPSK, QPSK, 16 QAM, or 64 QAM, of which a notification is sent with the downlink control information, or in a modulation method which is predefined for each channel. The modulation portion 1073 determines the number of data sequences which are spatially multiplexed on the basis of the information used for scheduling the PUSCH, maps a plurality of uplink data items which are transmitted in the same PUSCH to a plurality of sequences by using multiple input multiple output spatial multiplexing (MIMO SM), and performs precoding on the sequences.

The uplink reference signal generation portion 1079 generates sequences obtained according to a predefined rule (expression) on the basis of a physical cell identity (PCI; referred to as a cell ID or the like) for identifying the base station apparatus 3, a bandwidth in which the uplink reference signal is mapped, cyclic shift of which a notification has been sent in an uplink grant, values of parameters for generation of a DMRS sequence, and the like. In response to the control signal which is input from the control unit 103, the multiplexing portion 1075 arranges modulation symbols of the PUSCH in parallel, and performs discrete Fourier transform (DFT) thereon. In addition, the multiplexing portion 1075 multiplexes signals of the PUCCH and the PUSCH, and the generated uplink reference signal for each transmit antenna port. In other words, the multiplexing portion 1075 maps the signals of the PUCCH and the PUSCH and the generated uplink reference signal in resource elements for each transmit antenna port.

The radio transmission portion 1077 performs inverse fast Fourier transform (IFFT) on the multiplexed signal so as to perform modulation thereon in an SC-FDMA method; adds a guard interval to a SC-FDMA symbol which is SC-FDMA-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency; removes a remaining frequency component therefrom; amplifies power of the signal; and outputs the signal to the transmit and receive antenna 109 so that the signal is transmitted.

Figure 8:
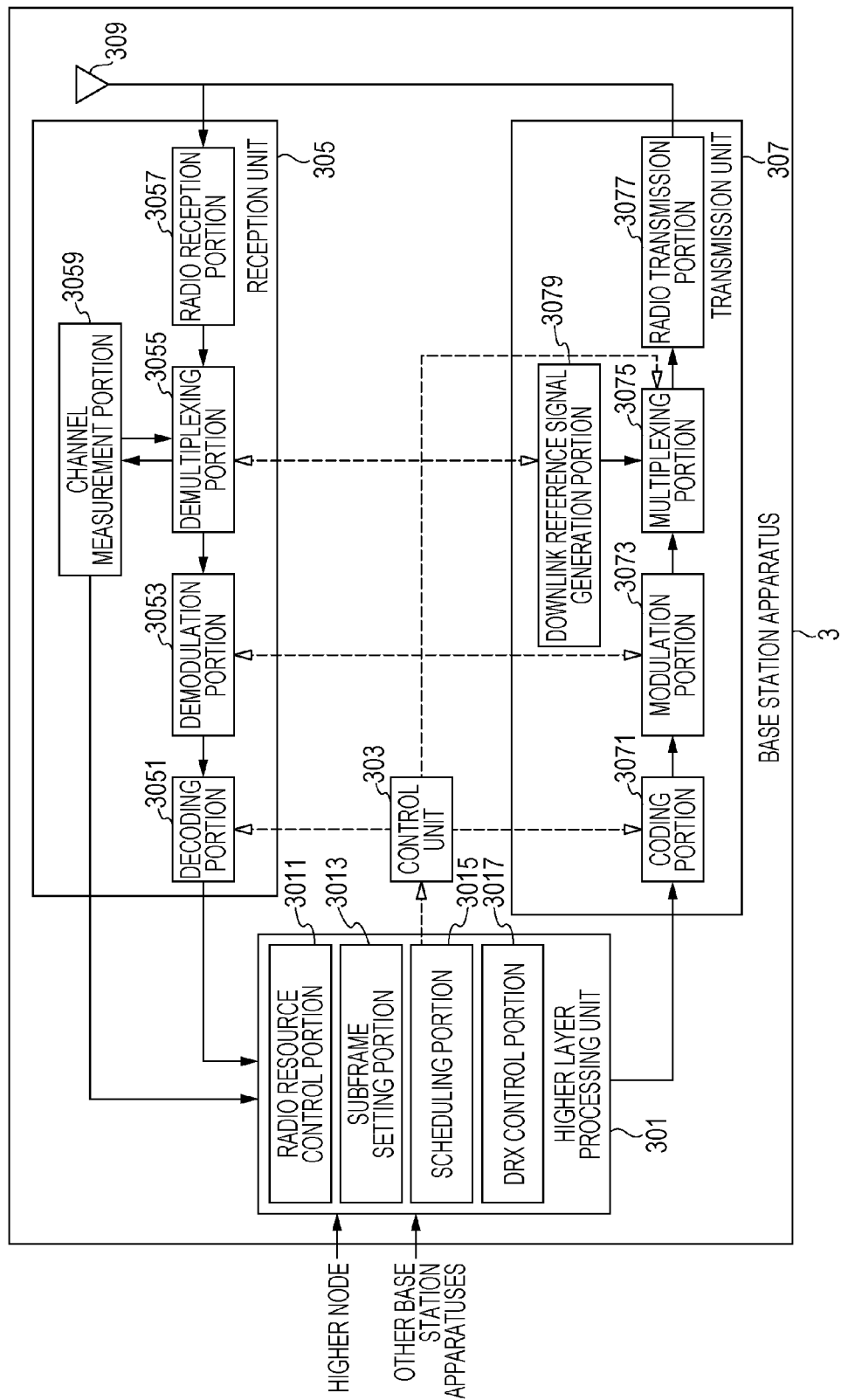
FIG. 8 is a schematic block diagram illustrating a configuration of a base station apparatus 3 of the present embodiment.

FIG. 8 is a schematic block diagram illustrating a configuration of the base station apparatus 3 of the present embodiment. As illustrated in FIG. 8, the base station apparatus 3 includes a higher layer processing unit 301, a control unit 303, a reception unit 305, a transmission unit 307, and a transmit and receive antenna 309. In addition, the higher layer processing unit 301 includes a radio resource control portion 3011, a subframe setting portion 3013, a scheduling portion 3015, and a DRX control portion 3017. Further, the reception unit 305 includes a decoding portion 3051, a demodulation portion 3053, a demultiplexing portion 3055, a radio reception portion 3057, and a channel measurement portion 3059. Furthermore, the transmission unit 307 includes a coding portion 3071, a modulation portion 3073, a multiplexing portion 3075, a radio transmission portion 3077, and a downlink reference signal generation portion 3079.

The higher layer processing unit 301 performs processes on a medium access control (MAC) layer, a packet data convergence protocol (PDCP) layer, a radio link control (RLC) layer, and a radio resource control (RRC) layer. In addition, the higher layer processing unit 301 generates control information for controlling the reception unit 305 and the transmission unit 307 and transmits the control information to the control unit 303.

The radio resource control portion 3011 of the higher layer processing unit 301 generates downlink data (transport block) which will be mapped in the PDSCH of a downlink, system information, an RRC message, an MAC control element (CE), and the like, or acquires the information from a higher node, and outputs the information to the transmission unit 307. In addition, the radio resource control portion 3011 manages various items of configuration information of each of the mobile station apparatuses 1.

The subframe setting portion 3013 of the higher layer processing unit 301 performs, on each of the mobile station apparatuses 1, management of the first uplink reference UL-DL configuration, the first downlink reference UL-DL configuration, the second uplink reference UL-DL configuration, the second downlink reference UL-DL configuration, and the transmission direction UL-DL configuration.

The subframe setting portion 3013 sets, in each of the mobile station apparatuses 1, the first uplink reference UL-DL configuration, the first downlink reference UL-DL configuration, the second uplink reference UL-DL configuration, the second downlink reference UL-DL configuration, and the transmission direction UL-DL configuration.

The subframe setting portion 3013 generates first information indicating the first uplink reference UL-DL configuration, second information indicating the first downlink reference UL-DL configuration, and third information indicating the transmission direction UL-DL configuration. The subframe setting portion 3013 transmits the first information, the second information, and the third information to the mobile station apparatus 1 via the transmission unit 307.

The base station apparatus 3 determines the first uplink reference UL-DL configuration, the first downlink reference UL-DL configuration, the second uplink reference UL-DL configuration, the second downlink reference UL-DL configuration, and/or the transmission direction UL-DL configuration for the mobile station apparatus 1. In addition, the base station apparatus 3 may be given an instruction for the first uplink reference UL-DL configuration, the first downlink reference UL-DL configuration, the second uplink reference UL-DL configuration, the second downlink reference UL-DL configuration, and/or the transmission direction UL-DL configuration, related to mobile station apparatus 1, from a higher node.

For example, the subframe setting portion 3013 may determine the first uplink reference UL-DL configuration, the first downlink reference UL-DL configuration, the second uplink reference UL-DL configuration, the second downlink reference UL-DL configuration, and/or the transmission direction UL-DL configuration on the basis of an uplink traffic amount and a downlink traffic amount.

The scheduling portion 3015 of the higher layer processing unit 301 determines a frequency and a subframe in which physical channels (the PDSCH and the PUSCH) are assigned, a coding rate of the physical channels (the PDSCH and the PUSCH), a modulation method, transmission power, and the like, on the basis of a channel estimation value, channel quality, or the like which is input from the channel measurement portion 3059. The scheduling portion 3015 determines whether a downlink physical channel and/or a downlink physical signal are (is) scheduled or an uplink physical channel and/or an uplink physical signal are (is) scheduled, in a flexible subframe. The scheduling portion 3015 generates control information (for example, a DCI format) for controlling the reception unit 305 and the transmission unit 307 on the basis of the scheduling result, and output the control information to the control unit 303.

The scheduling portion 3015 generates information used for scheduling the physical channels (the PDSCH and the PUSCH) on the basis of the scheduling result. The scheduling portion 3015 determines timings for performing a transmission process and a reception process on the basis of the first uplink reference UL-DL configuration, the first downlink reference UL-DL configuration, the second uplink reference UL-DL configuration, the second downlink reference UL-DL configuration, and/or the transmission direction UL-DL configuration.

The DRX control portion 3017 of the higher layer processing unit 301 specifies (selects, determines) a PDCCH subframe on the basis of the first uplink reference UL-DL configuration, and/or the first downlink reference UL-DL configuration, and/or the second uplink reference UL-DL configuration, and/or the second downlink reference UL-DL configuration, and/or the transmission direction UL-DL configuration.

The DRX control portion 3017 manages a timer related to the DRX on the basis of the PDCCH subframe. The DRX control portion 3017 determines whether or not the mobile station apparatus 1 monitors the PDCCH/EPDCCH in the subframe. The DRX control portion 3017 notifies the scheduling portion 3015 of the determination result.

The control unit 303 generates control signals for controlling the reception unit 305 and the transmission unit 307 on the basis of the control information from the higher layer processing unit 301. The control unit 303 outputs the generated control signals to the reception unit 305 and the transmission unit 307 so as to control the reception unit 305 and the transmission unit 307.

The reception unit 305 demultiplexes, demodulates and decodes a received signal which is received from the mobile station apparatus 1 via the transmit and receive antenna 309, in response to the control signal which is input from the control unit 303, and outputs the decoded information to the higher layer processing unit 301. The radio reception portion 3057 converts (down-converts) an uplink signal which is received via the transmit and receive antenna 309 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal.

The radio reception portion 3057 removes a portion corresponding to a guard interval (GI) from the converted digital signal. The radio reception portion 3057 performs fast Fourier transform (FFT) on the signal from which the guard interval is removed, so as to extract a signal of the frequency domain which is thus output to the demultiplexing portion 3055.

The demultiplexing portion 1055 demultiplexes the signal which is input from the radio reception portion 3057, into signals such as the PUCCH, the PUSCH, and the uplink reference signal. In addition, this demultiplexing is performed on the basis of radio resource assignment information which is determined in advance by the radio resource control portion 3011 and is included in an uplink grant of which the base station apparatus 3 notifies each mobile station apparatus 1. Further, the demultiplexing portion 3055 compensates channels such as the PUCCH and the PUSCH on the basis of channel estimation values which are input from the channel measurement portion 3059. Furthermore, the demultiplexing portion 3055 outputs the demultiplexed uplink reference signal to the channel measurement portion 3059.

The demodulation portion 3053 performs inverse discrete Fourier transform (IDFT) on the PUSCH so as to acquire modulation symbols, and performs demodulation of the received signal on each of modulation symbols of the PUCCH and the PUSCH, by using a modulation method which is predefined, such as binary phase shift keying (BPSK), quadrature phase shift keying (QPSK), 16 QAM, or 64 QAM, or a modulation method of which the base station apparatus 3 notifies the mobile station apparatus 1 in advance in an uplink grant. The demodulation portion 3053 demultiplexes modulation symbols of a plurality of uplink data items transmitted in the same PUSCH by using the MIMO SM on the basis of the number of spatially multiplexed sequences of which a notification is sent to each mobile station apparatus 1 in advance in the uplink grant and information for giving an instruction for precoding which will be performed on the sequences.

The decoding portion 3051 decodes coded bits of the demodulated PUCCH and PUSCH at a coding rate which is predefined in a predefined coding method or of which the base station apparatus notifies the mobile station apparatus 1 in the uplink grant in advance, and outputs decoded uplink data and uplink control information to the higher layer processing unit 101. In a case where the PUSCH is retransmitted, the decoding portion 3051 performs decoding by using coded bits which are input from the higher layer processing unit 301 and are stored in a HARQ buffer and the demodulated coded bits. The channel measurement portion 309 measures channel estimation values, quality of the channels, and the like on the basis of the uplink reference signal which is input from the demultiplexing portion 3055, and outputs the measured results to the demultiplexing portion 3055 and the higher layer processing unit 301.

The transmission unit 307 generates a downlink reference signal in response to the control signal which is input from the control unit 303, codes and modulates the HARQ indicator, the downlink control signal, and the downlink data which are input from the higher layer processing unit 301, multiplexes the PHICH, the PDCCH, the EPDCCH, the PDSCH, and the downlink reference signal, and transmits a signal to the mobile station apparatus 1 via the transmit and receive antenna 309.

The coding portion 3071 performs coding on the HARQ indicator, the downlink control information, and the downlink data which are input from the higher layer processing unit 301, by using a predefined coding method such as block coding, convolutional coding, or turbo coding, or by using a coding method determined by the radio resource control portion 3011. The modulation portion 3073 modulates the coded bits which are input from the coding portion 3071 by using a predefined modulation method such as BPSK, QPSK, 16 QAM, or 64 QAM, or by using a modulation method determined by the radio resource control portion 3011.

The downlink reference signal generation portion 3079 generates sequences which are obtained in a predefined rule and are known to the mobile station apparatus 1, as the downlink reference signal, on the basis of a physical cell identity (PCI) or the like for identifying the base station apparatus 3. The multiplexing portion 3075 multiplexes the modulation symbol of each modulated channel and the generated downlink reference signal. In other words, the multiplexing portion 3075 maps the modulation symbol of each modulated channel and the generated downlink reference signal in resource elements.

The radio transmission portion 3077 performs inverse fast Fourier transform (IFFT) on the multiplexed modulation symbol so as to perform modulation thereon in an OFDM method; adds a guard interval to an OFDM symbol which is OFDM-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency; removes a remaining frequency component therefrom; amplifies power of the signal; and outputs the signal to the transmit and receive antenna 309 so that the signal is transmitted.

Hereinafter, a description will be made of the first uplink reference uplink-downlink configuration (uplink reference UL-DL configuration), the first downlink reference uplink-downlink configuration (first reference UL-DL configuration), the second uplink reference UL-DL configuration, the second downlink reference UL-DL configuration, and the transmission direction uplink-downlink configuration (transmission direction UL-DL configuration).

The first uplink reference UL-DL configuration, the first downlink reference UL-DL configuration, the second uplink reference UL-DL configuration, the second downlink reference UL-DL configuration, and the transmission direction UL-DL configuration are defined by an uplink-downlink configuration (UL-DL configuration).

The uplink-downlink configuration is a configuration related to a pattern of subframes of a radio frame. The uplink-downlink configuration indicates that each subframe of the radio frame is one of a downlink subframe, an uplink subframe, and a special subframe.

In other words, the first uplink reference UL-DL configuration, the first downlink reference UL-DL configuration, the second uplink reference UL-DL configuration, the second downlink reference UL-DL configuration, and the transmission direction UL-DL configuration are defined by patterns of the downlink subframe, the uplink subframe, and the special subframe of the radio frame.

FIG. 9 is a table illustrating an example of an uplink-downlink configuration in the present embodiment. In FIG. 9, D indicates a downlink subframe, U indicates an uplink subframe, and S indicates a special subframe.

In FIG. 9, a subframe 1 of the radio frame is a special subframe at all times. In FIG. 9, subframes 0 to 5 are reserved for downlink transmission at all times, and the subframe 1 is reserved for uplink transmission at all times.

In FIG. 9, in a case where the downlink-to-uplink switch-point periodicity is 5 ms, a subframe 6 of the radio frame is a special subframe. In a case where the downlink-to-uplink switch-point periodicity is 10 ms, the subframe 6 of the radio frame is a downlink subframe.

The first uplink reference UL-DL configuration is also referred to as a first parameter, a first configuration, or a serving cell UL-DL configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

An uplink-downlink configuration i being set as the first or second uplink reference UL-DL configuration is referred to as first or second uplink reference UL-DL configuration i being set. An uplink-downlink configuration i being set as the first or second downlink reference UL-DL configuration is referred to as first or second downlink reference UL-DL configuration i being set. An uplink-downlink configuration i being set as the transmission direction UL-DL configuration is referred to as a transmission direction UL-DL configuration i being set.

Hereinafter, a description will be made of a method of setting the first uplink reference UL-DL configuration, the first downlink reference UL-DL configuration, and the transmission direction UL-DL configuration.

The base station apparatus 3 sets the first uplink reference UL-DL configuration, the first downlink reference UL-DL configuration, and the transmission direction UL-DL configuration. The base station apparatus 3 may transmit first information (TDD-Config) indicating the first uplink reference UL-DL configuration, second information indicating the first downlink reference UL-DL configuration, and third information indicating the transmission direction UL-DL configuration, which include at least one of an MIB, a system information block type 1 message, a system information message, an RRC message, an MAC control element (CE), and control information (for example, a DCI format) of a physical layer. In addition, the base station apparatus 3 may include the first information, the second information, and the third information in at least one of the MIB, the system information block type 1 message, the system information message, the RRC message, the MAC control element (CE), and the control information (for example a DCI format) of a physical layer, depending on circumstances.

The first uplink reference UL-DL configuration, the first downlink reference UL-DL configuration, the second uplink reference UL-DL configuration, the second downlink reference UL-DL configuration, and the transmission direction UL-DL configuration may be defined for each of a plurality of serving cells.

The base station apparatus 3 transmits the first information, the second information, and the third information for each serving cell, to the mobile station apparatus 1 for which a plurality of serving cells are set. In addition, the first information, the second information, and the third information may be defined for each serving cell.

The base station apparatus 3 may transmit, to the mobile station apparatus 1 for which two serving cells including a primary cell and a secondary cell are set, the first information for the primary cell, the second information for the primary cell, the third information for the primary cell, the first information for a secondary cell, the second information for the secondary cell, and the third information for the secondary cell.

The mobile station apparatus 1 for which the plurality of serving cells are set may set the first uplink reference UL-DL configuration, the first downlink reference UL-DL configuration, and the transmission direction UL-DL configuration in each serving cell on the basis of the first information, the second information, and the third information.

The mobile station apparatus 1 for which two serving cells including a primary cell and a secondary cell are set may set the first uplink reference UL-DL configuration for the primary cell, the first downlink reference UL-DL configuration for the primary cell, and the transmission direction UL-DL configuration for the primary cell, the first uplink reference UL-DL configuration for the secondary cell, the first downlink reference UL-DL configuration for the secondary cell, and the transmission direction UL-DL configuration for the secondary cell.

The first information for the primary cell is preferably included in the system information block type 1 message, or the RRC message. The first information for the secondary cell is preferably included in the RRC message. The second information for the primary cell is preferably included in the system information block type 1 message, the system information message, or the RRC message. The second information for the secondary cell is preferably included in the RRC message. The third information is preferably included in the MIB, the MAC CE, or the control information (for example, a DCI format) of a physical layer.

The first information is preferably common to a plurality of mobile station apparatuses 1 in a cell. The second information may be common to the plurality of mobile station apparatuses 1 in the cell, and may be specific to the mobile station apparatus 1. The third information may be common to the plurality of mobile station apparatuses 1 in the cell, and may be dedicated to the mobile station apparatus 1.

The second information may be transmitted along with the first information. The mobile station apparatus 1 in which the first downlink reference UL-DL configuration is not set on the basis of the second information may not receive the third information.

The periodicity of changing the transmission direction UL-DL configuration is preferably shorter than the periodicity of changing the downlink reference UL-DL configuration. A frequency of changing the transmission direction UL-DL configuration is preferably lower than a frequency of changing the downlink reference UL-DL configuration. The periodicity of changing the downlink reference UL-DL configuration is preferably shorter than the periodicity of changing the uplink reference UL-DL configuration. A frequency of changing the downlink reference UL-DL configuration is preferably lower than a frequency of changing the uplink reference UL-DL configuration.

The system information block type 1 message is transmitted in the subframe 5 of the radio frame satisfying SFN mod 2=0, via a PDSCH. The system information block type 1 message includes information indicating a configuration (lengths of a DwPTS, a GP, and a UpPTS) of a special subframe. The system information block type 1 message is cell-specific information.

The system information message is transmitted via the PDSCH. The system information message is cell-specific information. The system information message includes system information blocks X other than the system information block type 1 message.

The RRC message is transmitted via the PDSCH. The RRC message is information/signal which is processed in an RRC layer. The RRC message may be common to a plurality of mobile station apparatuses 1 in a cell, and may be dedicated to a specified mobile station apparatus 1.

The MAC CE is transmitted via the PDSCH. The MAC CE is information/signal which is processed in an MAC layer.

In a case where an RRC message including the first information, and/or the second information, and/or the third information are (is) received via the PDSCH, the mobile station apparatus 1 preferably sets (makes valid) the first uplink reference UL-DL configuration, and/or the first downlink reference UL-DL configuration, and/or the transmission direction UL-DL configuration in a subframe (timing) in which an RRC connection reconfiguration completion message corresponding to the RRC message is transmitted.

In a case where an MIB including the first information, and/or the second information, and/or the third information is received via a PBCH in a subframe n−k, the mobile station apparatus 1 preferably sets (makes valid) the first uplink reference UL-DL configuration/the first downlink reference UL-DL configuration, and/or the transmission direction UL-DL configuration in a subframe n. For example, k is 4 or 8. For example, k is determined on the basis of a table of FIG. 21 and the present first or second downlink reference UL-DL configuration. FIG. 21 will be described later.

In a case where an MAC CE including the first information, and/or the second information, and/or the third information is received via a PDSCH in a subframe n−k, the mobile station apparatus 1 preferably sets (makes valid) the first uplink reference UL-DL configuration, and/or the first downlink reference UL-DL configuration, and/or the transmission direction UL-DL configuration in a subframe n. For example, k is 4 or 8. For example, a subframe n+k is a subframe for transmitting a HARQ-ACK (ACK) of the PDSCH which is used to transmit the MAC CE. For example, k is determined on the basis of the table of FIG. 21 and the present first or second downlink reference UL-DL configuration.

In a case where control information (for example, a DCI format) of a physical layer including the first information, and/or the second information, and/or the third information is received via a downlink physical channel (for example, a PDCCH/EPDCCH) in a subframe n−k, the mobile station apparatus 1 preferably sets (makes valid) the first uplink reference UL-DL configuration, and/or the first downlink reference UL-DL configuration, and/or the transmission direction UL-DL configuration in a subframe n. For example, k is 4 or 8. For example, a subframe n+k is a subframe for transmitting a HARQ-ACK (ACK) of the downlink physical channel (for example, a PDCCH/EPDCCH) which is used to transmit the control information (for example, a DCI format) of a physical layer. For example, k is determined on the basis of the table of FIG. 21 and the present first or second downlink reference UL-DL configuration.

In addition, the mobile station apparatus 1 which receives the first information for a certain serving cell and does not receive the second information for the certain serving cell, and the base station apparatus 3 which transmits the first information for the certain serving cell and does not transmit the second information for the certain cell may set the first downlink reference UL-DL configuration for the certain serving cell on the basis of the first information for the certain serving cell. The mobile station apparatus 1 may disregard the third information for the certain serving cell for which the first downlink reference UL-DL configuration is set on the basis of the first information.

Figure 10:
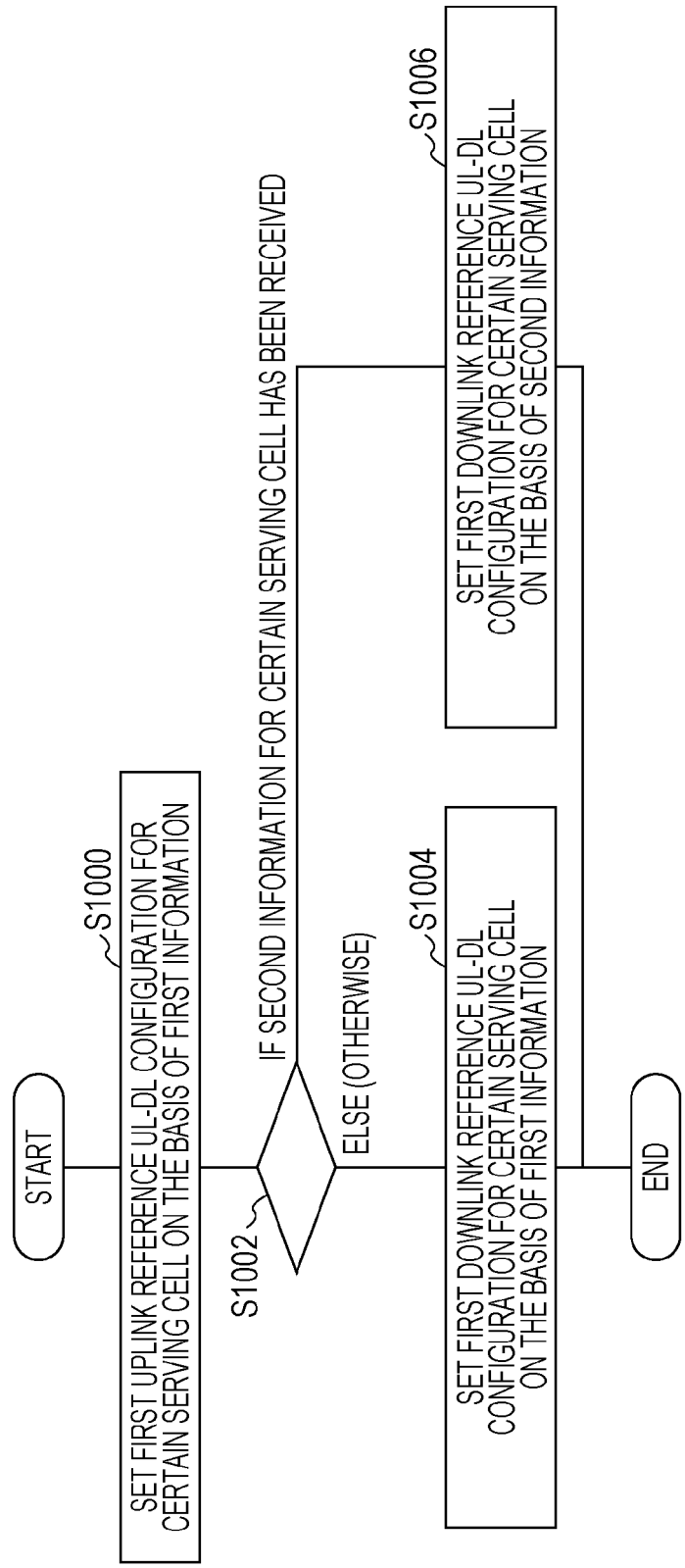
FIG. 10 is a flowchart illustrating a setting method of a first uplink reference UL-DL configuration and a first downlink reference UL-DL configuration in the present embodiment.

FIG. 10 is a flowchart illustrating a method of setting the first uplink reference UL-DL configuration and the first downlink reference UL-DL configuration in the present embodiment. The mobile station apparatus 1 performs the setting method illustrated in FIG. 10 on each of a plurality of serving cells.

The mobile station apparatus 1 sets the first uplink reference UL-DL configuration for a certain serving cell on the basis of the first information (step S1000). The mobile station apparatus 1 determines whether or not the second information for the certain serving cell has been received (step S1002). If the second information for the certain serving cell has been received, the mobile station apparatus 1 sets the first downlink reference UL-DL configuration for the certain serving cell on the basis of the second information for the certain serving cell (step S1006). If the second information for the certain serving cell has not been received (else/otherwise), the mobile station apparatus 1 sets the first downlink reference UL-DL configuration for the certain serving cell on the basis of the first information for the certain serving cell (step S1004).

A serving cell for which the first uplink reference UL-DL configuration and the first downlink reference UL-DL configuration are set on the basis of the first information is also referred to as a serving cell for which dynamic TDD is not set. A serving cell for which the first downlink reference UL-DL configuration is set on the basis of the second information is also referred to as a serving cell for which the dynamic TDD is set.

In a case where the first downlink reference UL-DL configuration is reset for a serving cell for which the transmission direction UL-DL configuration has been set, the mobile station apparatus 1 may clear/discard the transmission direction UL-DL configuration for the serving cell.

In addition, in a case where the first downlink reference UL-DL configuration which is reset for a serving cell for which the transmission direction UL-DL configuration has been set is the same as the previous first downlink reference UL-DL configuration, the mobile station apparatus 1 may not clear/discard the transmission direction UL-DL configuration for the serving cell. In other words, in a case where the first downlink reference UL-DL configuration for a serving cell for which the transmission direction UL-DL configuration has been set is changed, the mobile station apparatus 1 may clear/discard the transmission direction UL-DL configuration for the serving cell.

In a case where the base station apparatus 3 instructs the mobile station apparatus 1 to reset/change the first downlink reference UL-DL configuration for a serving cell for which the transmission direction UL-DL configuration has been set, it may be regarded that the transmission direction UL-DL configuration for the serving cell is cleared/discarded by the mobile station apparatus 1.

Further, in a case where the first uplink reference UL-DL configuration for a serving cell for which the first downlink reference UL-DL configuration and the transmission direction UL-DL configuration have been set is reset, the mobile station apparatus 1 may clear/discard the first downlink reference UL-DL configuration and the transmission direction UL-DL configuration.

In a case where the base station apparatus 3 instructs the mobile station apparatus 1 to reset/change the first uplink reference UL-DL configuration for a serving cell for which the first downlink reference UL-DL configuration and the transmission direction UL-DL configuration have been set is reset, it may be regarded that the first downlink reference UL-DL configuration and the transmission direction UL-DL configuration for the serving cell may be cleared/discarded by the mobile station apparatus 1.

The mobile station apparatus 1 receives the second information, determines a subframe in which an uplink signal can be transmitted on the basis of the second information, and then monitors whether or not the third information is received. If the third information is received, a subframe is determined in which an uplink signal can be transmitted on the basis of the third information.

For example, the base station apparatus 3 transmits the third information to the mobile station apparatus 1 by using (a) PDCCH/EPDCCH. The third information is used to control dynamic TDD operation in coverage of the base station apparatus 3 (cell). The third information is transmitted and received in a common search space (CSS) or a UE-specific search space (USS).

The CSS is a space in which the plurality of mobile station apparatuses 1 monitor (a) PDCCH/EPDCCH. The USS is a space which is defined on the basis of at least a C-RNTI. The C-RNTI is an identifier which is uniquely assigned to the mobile station apparatus 1.

Not the C-RNTI but a common identifier is preferably used for the PDCCH/EPDCCH which is used to transmit and receive the third information. In addition, a subframe may be restricted which is used for the mobile station apparatus 1 to monitor the PDCCH/EPDCCH including the third information. The base station apparatus 3 may control a subframe which is used for the mobile station apparatus 1 to monitor the PDCCH/EPDCCH including the third information.

For example, the PDCCH/EPDCCH including the third information may be allocated at intervals of ten subframes. For example, the mobile station apparatus 1 monitors the third information at intervals of ten subframes. A subframe in which the PDCCH/EPDCCH including the third information may be determined in advance. For example, the third information may be mapped only in the subframe 0 of the radio frame.

The base station apparatus 3 transmits the third information only in a case where it is determined that the third information is necessary. For example, in a case where it is determined that the transmission direction UL-DL configuration is changed, the base station apparatus 3 transmits the third information. For example, in a case where it is determined that the mobile station apparatus 1 which starts a dynamic TDD operation is required to be notified of the third information, the base station apparatus 3 transmits the third information thereto.

The mobile station apparatus 1 which starts the dynamic TDD operation monitors the PDCCH/EPDCCH including the third information in a subframe in which the PDCCH/EPDCCH including the third information is allocated.

The mobile station apparatus 1 tries to decode a received signal and determines whether or not the PDCCH/EPDCCH including the third information is detected. In a case where the PDCCH/EPDCCH including the third information is detected, the mobile station apparatus 1 determines a subframe in which an uplink signal can be transmitted on the basis of the detected third information. In a case where the PDCCH/EPDCCH including the third information is not detected, the mobile station apparatus 1 may maintain a determination hitherto regarding a subframe in which an uplink signal can be transmitted.

Hereinafter, a description will be made of a method of setting the second uplink reference UL-DL configuration.

In a case where a plurality of serving cells are set for the mobile station apparatus 1, and the first uplink reference UL-DL configurations for at least two serving cells are different from each other, the mobile station apparatus 1 and the base station apparatus 3 set the second uplink reference UL-DL configuration.

Except for the case where a plurality of serving cells are set for the mobile station apparatus 1, and the first uplink reference UL-DL configurations for at least two serving cells are different from each other, the mobile station apparatus 1 and the base station apparatus 3 may not set the second uplink reference UL-DL configuration.

A case excluding the case where the first uplink reference UL-DL configurations for at least two serving cells are different from each other is a case where the first uplink reference UL-DL configurations for all the serving cells are the same as each other. In a case where a single serving cell is set for the mobile station apparatus 1, the mobile station apparatus 1 and the base station apparatus 3 may not set the second uplink reference UL-DL configuration.

Figure 11:
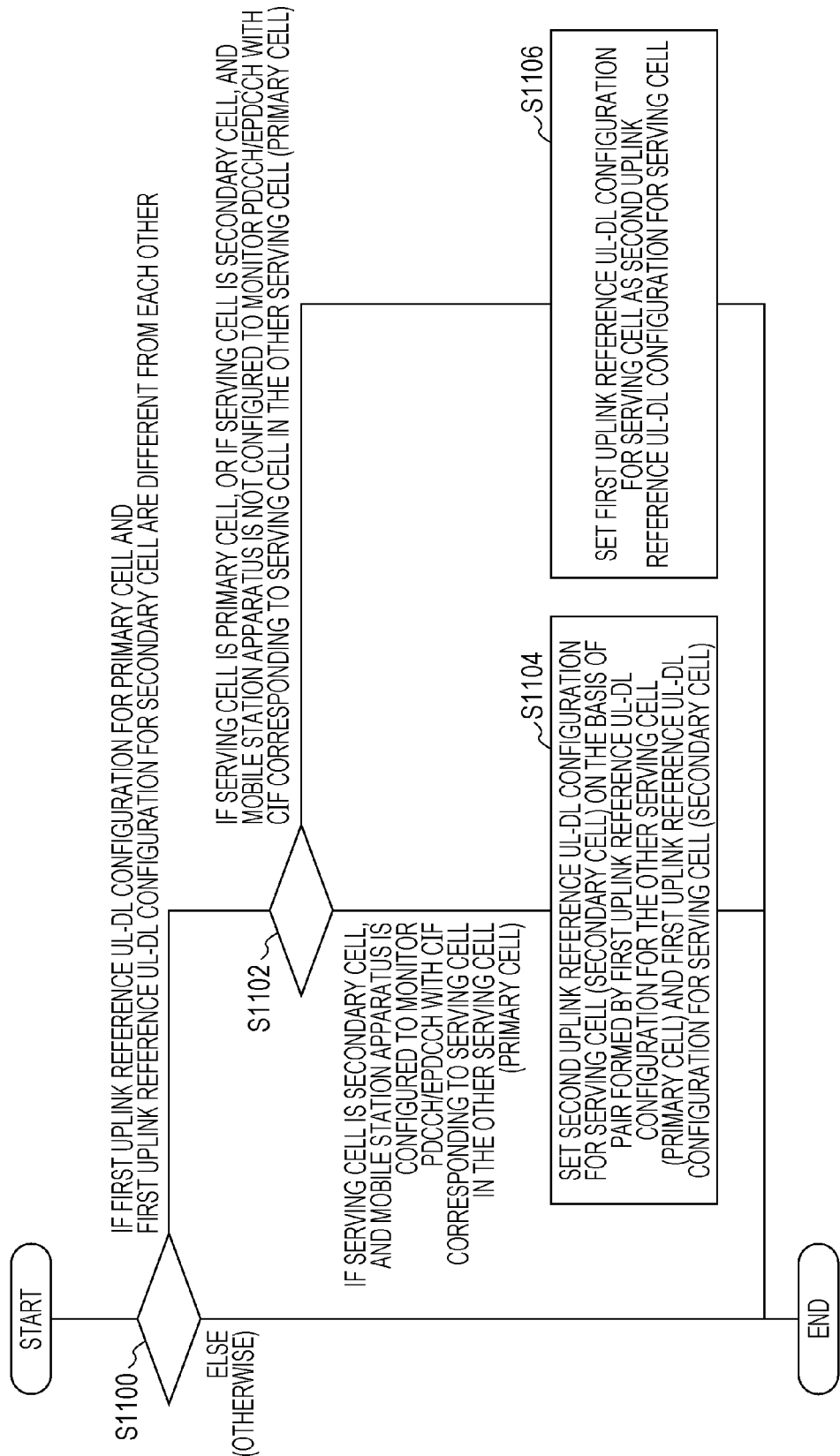
FIG. 11 is a flowchart illustrating a setting method of a second uplink reference UL-DL configuration in the present embodiment.

FIG. 11 is a flowchart illustrating a method of setting the second uplink reference UL-DL configuration in the present embodiment. In FIG. 11, a single primary cell and a single secondary cell are set for the mobile station apparatus 1. The mobile station apparatus 1 performs the setting method illustrated in FIG. 11 on each of the primary cell and the secondary cell.

The mobile station apparatus 1 determines whether or not the first uplink reference UL-DL configuration for the primary cell and the first uplink reference UL-DL configuration for the secondary cell are different from each other (step S1100). If the first uplink reference UL-DL configuration for the primary cell and the first uplink reference UL-DL configuration for the secondary cell are the same as each other, the mobile station apparatus 1 does not set the second uplink reference UL-DL configuration, and finishes the setting process of the second uplink reference UL-DL configuration.

If the first uplink reference UL-DL configuration for the primary cell and the first uplink reference UL-DL configuration for the secondary cell are different from each other, the mobile station apparatus 1 determines whether a serving cell is the primary cell or the secondary cell, and/or whether or not the mobile station apparatus 1 is set to monitor (a) PDCCH/EPDCCH including a carrier indicator field (CIF) so as to correspond to the serving cell in the other serving cell (step S1102).

If the serving cell is the secondary cell, and the mobile station apparatus 1 is set to monitor the PDCCH/EPDCCH including the CIF so as to correspond to the serving cell (secondary cell) in the other serving cell (primary cell), the mobile station apparatus 1 sets the second uplink reference UL-DL configuration for the serving cell (secondary cell) on the basis of a pair formed by the first uplink reference UL-DL configuration for the other serving cell (primary cell) and the first uplink reference UL-DL configuration for the serving cell (secondary cell) (step S1104).

In step S1104, the mobile station apparatus 1 sets the second uplink reference UL-DL configuration for the serving cell (secondary cell) on the basis of a table of FIG. 12. FIG. 12 is a diagram illustrating a correspondence between the pair formed by the first uplink reference UL-DL configuration for the other serving cell (primary cell) and the first uplink reference UL-DL configuration for the serving cell (secondary cell), and the second uplink reference UL-DL configuration for the secondary cell in the present embodiment.

In FIG. 12, a primary cell UL-DL configuration is set by referring to the first uplink reference UL-DL configuration for the other serving cell (primary cell). In FIG. 12, a secondary cell UL-DL configuration is set by referring to the first uplink reference UL-DL configuration for the serving cell (secondary cell).

For example, in a case where the first uplink reference UL-DL configuration 0 is set for the other serving cell (primary cell), and the first uplink reference UL-DL configuration 2 is set for the serving cell (secondary cell), the second uplink reference UL-DL configuration 1 is set for the secondary cell.

If the serving cell is primary cell, or the serving cell is the secondary cell and the mobile station apparatus 1 is not set to monitor the PDCCH/EPDCCH including the CIF so as to correspond to the serving cell (secondary cell) in the other serving cell (primary cell), the mobile station apparatus sets the first uplink reference UL-DL configuration for the serving cell as the second uplink reference UL-DL configuration for the serving cell (step S1106).

The base station apparatus 3 sets the second uplink reference UL-DL configuration on the basis of the setting method illustrated in FIG. 11.

Monitoring the PDCCH/EPDCCH including the CIF indicates trying to decode the PDCCH or the EPDCCH according to a DCI format including the CIF. The CIF is a field to which a carrier indicator is mapped. A value of the carrier indicator indicates a serving cell corresponding to a DCI format to which the carrier indicator is related.

The mobile station apparatus 1 which is set to monitor the PDCCH/EPDCCH including the CIF so as to correspond to the serving cell in the other serving cell monitors the PDCCH/EPDCCH including the CIF in the other serving cell.

The mobile station apparatus 1 which is set to monitor the PDCCH/EPDCCH including the CIF so as to correspond to the serving cell in the other serving cell preferably receives the third information for the serving cell via the PDCCH/EPDCCH.

The mobile station apparatus 1 which is not set to monitor the PDCCH/EPDCCH including the CIF so as to correspond to the serving cell in the other serving cell monitors the PDCCH/EPDCCH including the CIF or not including the CIF in the serving cell.

The mobile station apparatus 1 which is not set to monitor the PDCCH/EPDCCH including the CIF so as to correspond to the serving cell in the other serving cell preferably receives the third information for the serving cell via the PDCCH/EPDCCH.

The PDCCH/EPDCCH for the primary cell is transmitted in the primary cell. The third information for the primary cell is preferably transmitted via the PDCCH/EPDCCH of the primary cell.

The base station apparatus 3 transmits, to the mobile station apparatus 1, a parameter (cif-Presence-r10) indicating whether or not the CIF is included in a DCI format transmitted in the primary cell.

The base station apparatus 3 transmits, to the mobile station apparatus 1, a parameter (CrossCarrierScheduling-Config-r10) related to cross carrier scheduling for each secondary cell.

The parameter (CrossCarrierSchedulingConfig-r10) includes a parameter (schedulingCellInfo-r10) indicating whether (a) PDCCH/EPDCCH corresponding to a related secondary cell is transmitted in the secondary cell or in the other serving cells.

In a case where the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether or not the CIF is included in a DCI format transmitted in the secondary cell.

In a case where the parameter (schedulingCellInfo-r10) indicating that PDCCH/EPDCCH corresponding to a related secondary cell is transmitted in the other serving cells, the parameter (schedulingCellInfo-r10) includes a parameter (schedulingCellId) indicating to which serving cell a downlink assignment for the related secondary cell is sent.

Hereinafter, a description will be made of a method of setting the second downlink reference UL-DL configuration.

In a case where a plurality of serving cells are set for the mobile station apparatus 1, and the first downlink reference UL-DL configurations for at least two serving cells are different from each other, the mobile station apparatus 1 and the base station apparatus 3 set the second downlink reference UL-DL configuration. Except for the case where a plurality of serving cells are set for the mobile station apparatus 1, and the first downlink reference UL-DL configurations for at least two serving cells are different from each other, the mobile station apparatus 1 and the base station apparatus 3 may not set the second downlink reference UL-DL configuration.

A case excluding the case where the first downlink reference UL-DL configurations for at least two serving cells are different from each other is a case where the first downlink reference UL-DL configurations for all the serving cells are the same as each other. In a case where a single serving cell is set for the mobile station apparatus 1, the mobile station apparatus 1 and the base station apparatus 3 may not set the second downlink reference UL-DL configuration.

Figure 13:
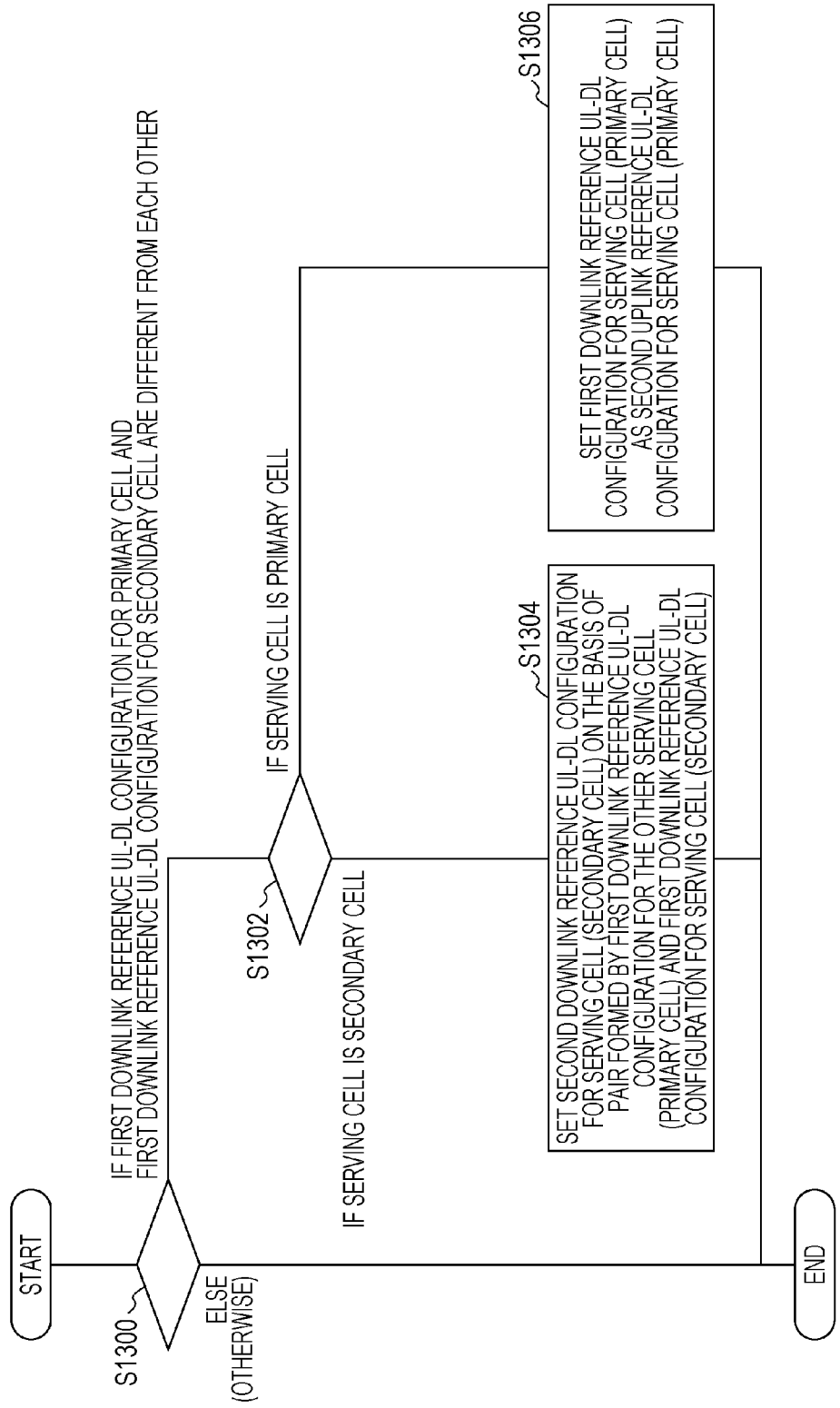
FIG. 13 is a flowchart illustrating a setting method of a second downlink reference UL-DL configuration in the present embodiment.

FIG. 13 is a flowchart illustrating a method of setting the second downlink reference UL-DL configuration in the present embodiment. In FIG. 13, a single primary cell and a single secondary cell are set for the mobile station apparatus 1. The mobile station apparatus 1 performs the setting method illustrated in FIG. 13 on each of the primary cell and the secondary cell.

The mobile station apparatus 1 determines whether or not the first downlink reference UL-DL configuration for the primary cell and the first downlink reference UL-DL configuration for the secondary cell are different from each other (step S1300). If the first downlink reference UL-DL configuration for the primary cell and the first downlink reference UL-DL configuration for the secondary cell are the same as each other, the mobile station apparatus 1 does not the second downlink reference UL-DL configuration, and finishes the setting process of the second downlink reference UL-DL configuration.

If the first downlink reference UL-DL configuration for the primary cell and the first downlink reference UL-DL configuration for the secondary cell are different from each other, the mobile station apparatus 1 determines whether a serving cell is the primary cell or the secondary cell (step S1302).

If the serving cell is the secondary cell, the mobile station apparatus 1 sets the second uplink reference UL-DL configuration for the serving cell (secondary cell) on the basis of a pair formed by the first downlink reference UL-DL configuration for the other serving cell (primary cell) and the first downlink reference UL-DL configuration for the serving cell (secondary cell) (step S1304).

In step S1304, the mobile station apparatus 1 sets the second downlink reference UL-DL configuration for the serving cell (secondary cell) on the basis of a table of FIG. 14. FIG. 14 is a diagram illustrating a correspondence between the pair formed by the first downlink reference UL-DL configuration for the primary cell and the first downlink reference UL-DL configuration for the secondary cell, and the second downlink reference UL-DL configuration for the secondary cell.

In FIG. 14, a primary cell UL-DL configuration is set by referring to the first downlink reference UL-DL configuration for the primary cell. In FIG. 14, a secondary cell UL-DL configuration is set by referring to the first downlink reference UL-DL configuration for the secondary cell.

In a case where the pair formed by the first downlink reference UL-DL configuration for the primary cell and the first downlink reference UL-DL configuration for the secondary cell belongs to a set 1 of FIG. 14, the second downlink reference UL-DL configuration for the secondary cell is defined in the set 1.

In a case where the mobile station apparatus 1 is not set to monitor (a) PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 2 of FIG. 14, the second downlink reference UL-DL configuration for the secondary cell is defined in the set 2.

In a case where the mobile station apparatus 1 is not set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 3 of FIG. 14, the second downlink reference UL-DL configuration for the secondary cell is defined in the set 3.

In a case where the mobile station apparatus 1 is set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 4 of FIG. 14, the second downlink reference UL-DL configuration for the secondary cell is defined in the set 4.

In a case where the mobile station apparatus 1 is set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 5 of FIG. 14, the second downlink reference UL-DL configuration for the secondary cell is defined in the set 5.

For example, in a case where the first downlink reference UL-DL configuration 1 is set for the primary cell, and the first downlink reference UL-DL configuration 0 is set for the secondary cell, the second downlink reference UL-DL configuration 1 is set for the secondary cell.

If the serving cell is primary cell, the mobile station apparatus sets the first downlink reference UL-DL configuration for the serving cell (primary cell) as the second downlink reference UL-DL configuration for the serving cell (primary cell) (step S1306).

In addition, the base station apparatus 3 the second downlink reference UL-DL configuration on the basis of the setting method illustrated in FIG. 13.

Hereinafter, the first uplink reference UL-DL configuration will be described.

The first uplink reference UL-DL configuration is at least used to specify a subframe in which uplink transmission can or not be performed in a serving cell.

The mobile station apparatus 1 does not uplink transmission in a subframe which is indicated as a downlink subframe by the first uplink reference UL-DL configuration. The mobile station apparatus 1 does not uplink transmission in a DwPTS and a GP of a subframe which is indicated as a special subframe by the first uplink reference UL-DL configuration.

Hereinafter, the first downlink reference UL-DL configuration will be described.

The first downlink reference UL-DL configuration is at least used to specify a subframe in which downlink transmission can be performed or cannot be performed in a serving cell.

The mobile station apparatus 1 does not downlink transmission in a subframe which is indicated as an uplink subframe by the first downlink reference UL-DL configuration. The mobile station apparatus 1 does not downlink transmission in a UpPTS and a GP of a subframe which is indicated as a special subframe by the first downlink reference UL-DL configuration.

The mobile station apparatus 1 which sets the first downlink reference UL-DL configuration on the basis of the first information may perform a measurement (for example, a measurement regarding channel state information) using a downlink signal in a downlink subframe or a DwPTS of a special subframe which is indicated by the first uplink reference UL-DL configuration or the first downlink reference UL-DL configuration.

Therefore, in the dynamic TDD, if the base station apparatus 3 uses a subframe which is indicated as a downlink subframe by the first uplink reference UL-DL configuration, as an uplink subframe or a special subframe, or uses a subframe which is indicated as a special subframe by the first uplink reference UL-DL configuration, as an uplink subframe, there is a problem in that the mobile station apparatus 1 in which the first downlink reference UL-DL configuration on the basis of the first information cannot appropriately perform the measurement using a downlink signal.

Thus, the base station apparatus 3 determines a downlink reference UL-DL configuration from a configuration set (configurations of the set) which are restricted based on the first uplink reference UL-DL configuration. In other words, the first downlink reference UL-DL configuration is an element of the configuration set which is restricted on the basis of the first uplink reference UL-DL configuration. The configuration set restricted on the basis of the first uplink reference UL-DL configuration includes uplink reference UL-DL configurations which satisfy the following conditions (a) to (c). FIG. 15 is a diagram relationship between a subframe indicated by the first uplink reference UL-DL configuration and a subframe indicated by the first downlink reference UL-DL configuration. In FIG. 15, D indicates a downlink subframe, U indicates an uplink subframe, and S indicates a special subframe.

Condition (a): a subframe which is indicated as a downlink subframe by the first uplink reference UL-DL configuration is indicated as a downlink subframe.

Condition (b): a subframe which is indicated as an uplink subframe by the first uplink reference UL-DL configuration is indicated as an uplink subframe or a downlink subframe.

Condition (c): a subframe which is indicated as a special subframe by the first uplink reference UL-DL configuration is indicated as a downlink subframe or a special subframe.

Consequently, in the dynamic TDD, since a subframe which is indicated as a downlink subframe by the first uplink reference UL-DL configuration, and a DwPTS of a special subframe are not used for uplink transmission, the mobile station apparatus 1 which sets the first downlink reference UL-DL configuration on the basis of the first information can appropriately perform a measurement using a downlink signal.

In addition, the mobile station apparatus 1 which sets the first downlink reference UL-DL configuration on the basis of the second information may also perform a measurement (for example, a measurement regarding channel state information) using a downlink signal in a downlink subframe or a DwPTS of a special subframe indicated by the first uplink reference UL-DL configuration.

A subframe which is indicated as an uplink subframe by the first uplink reference UL-DL configuration and is indicated as a downlink subframe by the first downlink reference UL-DL configuration is also referred to as a first flexible subframe. The first flexible subframe is a subframe which is reserved for uplink and downlink transmission.

A subframe which is indicated as a special subframe by the first uplink reference UL-DL configuration and is indicated as a downlink subframe by the first downlink reference UL-DL configuration is also referred to as a second flexible subframe. The second flexible subframe is a subframe which is reserved for downlink transmission. The second flexible subframe is a subframe which is reserved for downlink transmission in a DwPTS and uplink transmission in a UpPTS.

Hereinafter, the transmission direction UL-DL configuration will be described in detail.

If the mobile station apparatus 1 determines a transmission direction (up/down) on the basis of the first uplink reference UL-DL configuration, the first downlink reference UL-DL configuration, and scheduling information (a DCI format and/or a HARQ-ACK), there is a problem in that the mobile station apparatus 1 which wrongly receives/decodes the scheduling information (a DCI format and/or a HARQ-ACK) transmits an uplink signal in a subframe in which the base station apparatus 3 transmits a downlink signal to other mobile station apparatuses 1, and thus the uplink signal interferes with the downlink signal.

Therefore, the mobile station apparatus 1 and the base station apparatus 3 of the present invention sets the transmission direction UL-DL configuration regarding a transmission direction (up/down) in a subframe. The transmission direction UL-DL configuration is used to determine a transmission direction in a subframe.

The mobile station apparatus 1 controls transmission in the first flexible subframe and the second flexible subframe on the basis of the scheduling information (a DCI format and/or a HARQ-ACK) and the transmission direction UL-DL configuration.

The base station apparatus 3 transmits the third information indicating the transmission direction UL-DL configuration to the mobile station apparatus 1. The third information is information indicating a subframe in which uplink transmission can be performed. The third information is information indicating a subframe in which downlink transmission can be performed. The third information is information indicating a subframe in which uplink transmission in the UpPTS and downlink transmission in the DwPTS can be performed.

For example, the transmission direction UL-DL configuration is used to specify a transmission direction in a subframe which is indicated as an uplink subframe by the first uplink reference UL-DL configuration and is indicated as a downlink subframe by the first downlink reference UL-DL configuration, and/or a subframe which is indicated as a special subframe by the first uplink reference UL-DL configuration and is indicated as a downlink subframe by the first downlink reference UL-DL configuration. In other words, the transmission direction UL-DL configuration is used to specify a transmission direction in a subframe which is indicated as a subframe different from a subframe which is indicated by the first uplink reference UL-DL configuration and the first downlink reference UL-DL configuration.

FIG. 16 is a diagram illustrating a relationship between a subframe indicated by the first uplink reference UL-DL configuration, a subframe indicated by the first downlink reference UL-DL configuration, and a subframe indicated by the transmission direction UL-DL configuration in the present embodiment. In FIG. 16, D indicates a downlink subframe, U indicates an uplink subframe, and S indicates a special subframe.

The base station apparatus 3 determines the transmission direction UL-DL configuration from a configuration set (configurations of the set) which is restricted on the basis of the first uplink reference UL-DL configuration and the first downlink reference UL-DL configuration. In other words, the transmission direction UL-DL configuration is an element of the configuration set which is restricted on the basis of the first uplink reference UL-DL configuration and the first downlink reference UL-DL configuration. The configuration set which is restricted on the basis of the first uplink reference UL-DL configuration and the first downlink reference UL-DL configuration includes UL-DL configurations which satisfy the following conditions (d) to (h).

Condition (d): a subframe which is indicated as a downlink subframe by the first uplink reference UL-DL configuration and the first downlink reference UL-DL configuration is indicated as a downlink subframe.

Condition (e): a subframe which is indicated as an uplink subframe by the first uplink reference UL-DL configuration and the first downlink reference UL-DL configuration is indicated as an uplink subframe.

Condition (f): a subframe which is indicated as an uplink subframe by the first uplink reference UL-DL configuration but is indicated as a downlink subframe by the first downlink reference UL-DL configuration is indicated as an uplink subframe or a downlink subframe.

Condition (g): a subframe which is indicated as a special subframe by the first uplink reference UL-DL configuration and the first downlink reference UL-DL configuration is indicated as a special subframe.

Condition (h): a subframe which is indicated as a special subframe by the first uplink reference UL-DL configuration but is indicated as a downlink subframe by the first downlink reference UL-DL configuration is indicated as a special subframe or a downlink subframe.

The base station apparatus 3 may perform scheduling of downlink transmission in a subframe which is indicated as a downlink subframe by the transmission direction UL-DL configuration.

The mobile station apparatus 1 may perform a reception process of a downlink signal in a subframe which is indicated as a downlink subframe by the transmission direction UL-DL configuration. The mobile station apparatus 1 may perform monitoring of the PDCCH/EPDCCH in a subframe which is indicated as a downlink subframe by the transmission direction UL-DL configuration. The mobile station apparatus 1 may perform a reception process of a PDSCH in a subframe which is indicated as a downlink subframe by the transmission direction UL-DL configuration on the basis of detection of a downlink grant using the PDCCH/EPDCCH.

In a case where transmission of an uplink signal (PUSCH/SRS) in a subframe indicated as a downlink subframe by the transmission direction UL-DL configuration is scheduled or set, the mobile station apparatus 1 does not perform a transmission process of the uplink signal (PUSCH/SRS) in the subframe.

The base station apparatus 3 may perform scheduling of uplink transmission in a subframe which is indicated as an uplink subframe by the transmission direction UL-DL configuration.

The base station apparatus 3 may perform scheduling of downlink transmission in a subframe which is indicated as an uplink subframe by the transmission direction UL-DL configuration. The base station apparatus 3 may be prohibited from performing scheduling of downlink transmission in a subframe which is indicated as an uplink subframe by the transmission direction UL-DL configuration.

The mobile station apparatus 1 may perform a transmission process of an uplink signal in a subframe which is indicated as an uplink subframe by the transmission direction UL-DL configuration. In a case where transmission of an uplink signal (PUSCH/DMRS/SRS) in a subframe indicated as an uplink subframe by the transmission direction UL-DL configuration is scheduled or set, the mobile station apparatus 1 may perform a transmission process of the uplink signal (PUSCH/DMRS/SRS) in the subframe.

The mobile station apparatus 1 may perform a reception process of a downlink signal in a subframe which is indicated as an uplink subframe by the transmission direction UL-DL configuration and in which uplink transmission is not scheduled. The mobile station apparatus 1 may be prohibited from performing a reception process of a downlink signal in a subframe which is indicated as an uplink subframe by the transmission direction UL-DL configuration.

The base station apparatus 3 performs scheduling of downlink transmission in a DwPTS of subframe which is indicated as a special subframe by the transmission direction UL-DL configuration.

The mobile station apparatus 1 may perform a reception process of a downlink signal in a DwPTS of a subframe which is indicated as a special subframe by the transmission direction UL-DL configuration. The mobile station apparatus 1 may perform monitoring of the PDCCH/EPDCCH in a DwPTS of a subframe which is indicated as a special subframe by the transmission direction UL-DL configuration. The mobile station apparatus 1 may perform a reception process of a PDSCH in a DwPTS of a subframe which is indicated as a special subframe by the transmission direction UL-DL configuration on the basis of detection of a downlink grant using the PDCCH/EPDCCH.

In a case where transmission of a PUSCH in a subframe indicated as a special subframe by the transmission direction UL-DL configuration is scheduled or set, the mobile station apparatus 1 does not perform a transmission process of the PUSCH in the subframe.

In a case where transmission of an SRS in a UpPTS of a subframe indicated as a special subframe by the transmission direction UL-DL configuration is scheduled or set, the mobile station apparatus 1 may perform a transmission process of the SRS in the UpPTS of the subframe.

FIG. 17 is a diagram illustrating a relationship between the first uplink reference UL-DL configuration, the first downlink reference UL-DL configuration, and the transmission direction UL-DL configuration.

For example, in FIG. 17, in a case where the first uplink reference UL-DL configuration is 0, the first downlink reference UL-DL configuration is one of a set {0, 1, 2, 3, 4, 5, 6}. For example, in FIG. 17, in a case where the first uplink reference UL-DL configuration is 1, the first downlink reference UL-DL configuration is one of a set {1, 2, 4, 5}.

For example, in FIG. 17, in a case where the first uplink reference UL-DL configuration is 0, and the first downlink reference UL-DL configuration is 1, the transmission direction UL-DL configuration is one of a set {0, 1, 6}.

In addition, a value of the first downlink reference UL-DL configuration may be the same as a value of the first uplink reference UL-DL configuration. However, in order for the mobile station apparatus 1 which has not received the second information to set the same value as a value of the first uplink reference UL-DL configuration as the first downlink reference UL-DL configuration, a value of the first downlink reference UL-DL configuration indicated by the second information is not preferably the same as a value of the first uplink reference UL-DL configuration indicated by the first information.

In a case where a value of the first uplink reference UL-DL configuration is the same as a value of the first downlink reference UL-DL configuration, the transmission direction UL-DL configuration may not be defined. Alternatively, in a case where a value of the first uplink reference UL-DL configuration is the same as a value of the first downlink reference UL-DL configuration, the same value as the value of the first uplink reference UL-DL configuration and the value of the first downlink reference UL-DL configuration may be set as the transmission direction UL-DL configuration.

In addition, as a configuration set which is restricted on the basis of the first uplink reference UL-DL configuration and the first downlink reference UL-DL configuration, a configuration set (configurations of the set) which is constituted by UL-DL configurations of the first uplink reference UL-DL configuration and UL-DL configurations of the first downlink reference UL-DL configuration may be used.

For example, in a case where the first uplink reference UL-DL configuration is 0, and the first downlink reference UL-DL configuration is 1, a configuration set which is restricted on the basis of the first uplink reference UL-DL configuration and the first downlink reference UL-DL configuration is {0, 1}. In this case, the third information preferably has 1 bit.

The third information may be information indicating the transmission direction UL-DL configuration (configurations of the set) from the configuration set constituted by the first uplink reference UL-DL configuration and the first downlink reference UL-DL configuration.

Hereinafter, the first uplink reference UL-DL configuration and the second uplink reference UL-DL configuration will be described in detail.

The first uplink reference UL-DL configuration and the second uplink reference UL-DL configuration are used to specify (select, determine) a correspondence between a subframe n in which the PDCCH/EPDCCH/PHICH is allocated and a subframe n+k in which the PUSCH corresponding to the PDCCH/EPDCCH/PHICH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to determine a correspondence between a subframe in which the PDCCH/EPDCCH/PHICH is allocated and a subframe in which the PUSCH corresponding to the PDCCH/EPDCCH/PHICH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding second uplink reference UL-DL configuration is used to determine a correspondence between a subframe in which the PDCCH/EPDCCH/PHICH is allocated and a subframe in which the PUSCH corresponding to the PDCCH/EPDCCH/PHICH is allocated in each of the two serving cells.

FIG. 18 is a diagram illustrating a correspondence between the subframe n in which the PDCCH/EPDCCH/PHICH is allocated and the subframe n+k in which the PUSCH corresponding to the PDCCH/EPDCCH/PHICH is allocated in the present embodiment. The mobile station apparatus 1 specifies (selects, determines) a value of k on the basis of a table of FIG. 18.

In FIG. 18, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 18, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 18, the first uplink reference UL-DL configuration and the second uplink reference UL-DL configuration are simply referred to as an uplink-downlink configuration.

In a case where the mobile station apparatus 1 detects the PDCCH/EPDCCH and including an uplink grant which corresponds to a serving cell for which uplink-downlink configurations of 1 to 6 and targets the mobile station apparatus 1 in the subframe n, the PUSCH corresponding to the uplink grant is transmitted in the subframe n+k which is specified (selected, determined) on the basis of the table of FIG. 18.

In a case where the mobile station apparatus 1 detects the PHICH including a NACK which corresponds to a serving cell for which uplink-downlink configurations of 1 to 6 and targets the mobile station apparatus 1 in the subframe n, the PUSCH corresponding to the uplink grant is transmitted in the subframe n+k which is specified (selected, determined) on the basis of the table of FIG. 18.

An uplink grant which corresponds to a serving cell for which the uplink-downlink configuration 0 is set and targets the mobile station apparatus 1 includes a 2-bit uplink index (UL index). An uplink grant corresponds to a serving cell for which the uplink-downlink configurations 1 to 6 are set and targets the mobile station apparatus 1 does not include the uplink index (UL index).

In a case where 1 is set to a most significant bit (MSB) of an uplink index included in the uplink grant corresponding to a serving cell for which the uplink-downlink configuration 0 is set in the subframe n, the mobile station apparatus 1 adjusts transmission of the PUSCH corresponding to the uplink grant in the subframe n+k which is specified (selected, determined) on the basis of the table of FIG. 18.

In a case where the mobile station apparatus 1 receives a PHICH including the NACK corresponding to a serving cell for which the uplink-downlink configuration 0 is set in a first resource set of the subframe n=0 or 5, the mobile station apparatus 1 adjusts transmission of the PUSCH corresponding to the PHICH in the subframe n+k which is specified (selected, determined) on the basis of the table of FIG. 18.

In a case where 1 is set to a least significant bit (LSB) of an uplink index included in the uplink grant corresponding to a serving cell for which the uplink-downlink configuration 0 is set in the subframe n, the mobile station apparatus 1 adjusts transmission of the PUSCH corresponding to the uplink grant in the subframe n+7.

In a case where the mobile station apparatus 1 receives a PHICH including the NACK corresponding to a serving cell for which the uplink-downlink configuration 0 is set in a second resource set of the subframe n=0 or 5, the mobile station apparatus 1 adjusts transmission of the PUSCH corresponding to the uplink grant in the subframe n+7.

In a case where the mobile station apparatus 1 receives a PHICH including the NACK corresponding to a serving cell for which the uplink-downlink configuration 0 is set in the subframe n=1 or 6, the mobile station apparatus 1 adjusts transmission of the PUSCH corresponding to the uplink grant in the subframe n+7.

For example, in a case where the mobile station apparatus 1 detects a PDCCH, an EPDCCH, or a PHICH corresponding to a serving cell for which the uplink-downlink configuration 0 is set in [SFN=m, subframe 1], the mobile station apparatus adjusts transmission of the PUSCH in [SFN=m, subframe 7] which is six subframes later than the subframe.

The first uplink reference UL-DL configuration and the second uplink reference UL-DL configuration are used to specify (select, determine) a correspondence between the subframe n in which the PHICH is allocated and the subframe n−k in which the PUSCH corresponding to the PHICH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to specify (select, determine) a correspondence between the subframe n in which the PHICH is allocated and the subframe n−k in which the PUSCH corresponding to the PHICH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding second uplink reference UL-DL configuration is used to specify (select, determine) a correspondence between the subframe n in which the PHICH is allocated and the subframe n−k in which the PUSCH corresponding to the PHICH is allocated in each of the two serving cells.

FIG. 19 is a diagram illustrating a correspondence between the subframe n in which the PHICH is allocated and the subframe n−k in which the PUSCH corresponding to the PHICH is allocated in the present embodiment. The mobile station apparatus 1 specifies (selects, determines) a value of k on the basis of a table of FIG. 19.

In FIG. 19, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 19, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 19, the first uplink reference UL-DL configuration and the second uplink reference UL-DL configuration are simply referred to as an uplink-downlink configuration.

Regarding a serving cell for which the uplink-downlink configurations 1 to 6 are set, a HARQ indicator (HARQ-ACK) which is received via a PHICH corresponding to the serving cell in the subframe n is related to transmission of a PUSCH in the subframe n−k which is specified on the basis of the table of FIG. 19.

Regarding a serving cell for which the uplink-downlink configuration 0 is set, a HARQ indicator (HARQ-ACK) which is received via a PHICH corresponding to the serving cell in a first resource set of the subframe n=0 or 5, or in the subframes n=1 or 6, is related to transmission of a PUSCH in the subframe n−k which is specified on the basis of the table of FIG. 19.

Regarding a serving cell for which the uplink-downlink configuration 0 is set, a HARQ indicator (HARQ-ACK) which is received via a PHICH corresponding to the serving cell in a second resource set of the subframe n=0 or 5 is related to transmission of a PUSCH in the subframe n−6.

For example, regarding a serving cell for which the uplink-downlink configuration 1 is set, a HARQ indicator (HARQ-ACK) which is received via the PHICH in [SFN=m, subframe 1] is related to transmission of the PUSCH in [SFN=m−1, subframe 7] which is four subframes earlier than the subframe.

The first uplink reference UL-DL configuration and the second uplink reference UL-DL configuration are used to specify (select, determine) a correspondence between the subframe n in which a PUSCH is allocated and the subframe n+k in which a PHICH corresponding to the PUSCH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to specify (select, determine) a correspondence between the subframe n in which the PUSCH is allocated and the subframe n+k in which the PHICH corresponding to the PUSCH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding second uplink reference UL-DL configuration is used to specify (select, determine) a correspondence between the subframe n in which the PUSCH is allocated and the subframe n+k in which the PHICH corresponding to the PUSCH is allocated in each of the two serving cells.

FIG. 20 is a diagram illustrating a correspondence between the subframe n in which the PUSCH is allocated and the subframe n+k in which the PHICH corresponding to the PUSCH is allocated in the present embodiment. The mobile station apparatus 1 specifies (selects, determines) a value of k on the basis of a table of FIG. 20.

In FIG. 20, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 20, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 20, the first uplink reference UL-DL configuration and the second uplink reference UL-DL configuration are simply referred to as an uplink-downlink configuration.

In a case where transmission of the PUSCH is scheduled in the subframe n, the mobile station apparatus 1 determines a PHICH resource in the subframe n+k which is specified on the basis of the table of FIG. 20.

For example, regarding a serving cell for which the uplink-downlink configuration 0 is set, in a case where transmission of the PUSCH is scheduled in [SFN=m, subframe n=2], a PHICH resource is determined in [SFN=m, subframe n=6].

For example, regarding a serving cell for which the uplink-downlink configuration 0 is set, in a case where transmission of the PUSCH is scheduled in [SFN=m, subframe n=3], a PHICH resource is determined from a first resource set in [SFN=m+1, subframe n=0].

For example, regarding a serving cell for which the uplink-downlink configuration 0 is set, in a case where transmission of the PUSCH is scheduled in [SFN=m, subframe n=4], a PHICH resource is determined from a second resource set in [SFN=m+1, subframe n=0].

For example, regarding a serving cell for which the uplink-downlink configuration 0 is set, in a case where transmission of the PUSCH is scheduled in [SFN=m, subframe n=7], a PHICH resource is determined in [SFN=m+1, subframe n=1].

For example, regarding a serving cell for which the uplink-downlink configuration 0 is set, in a case where transmission of the PUSCH is scheduled in [SFN=m, subframe n=8], a PHICH resource is determined from a first resource set in [SFN=m+1, subframe n=5].

For example, regarding a serving cell for which the uplink-downlink configuration 0 is set, in a case where transmission of the PUSCH is scheduled in [SFN=m, subframe n=9], a PHICH resource is determined from a second resource set in [SFN=m+1, subframe n=5].

Hereinafter, the first downlink reference UL-DL configuration and the second downlink reference UL-DL configuration will be described in detail.

The first downlink reference UL-DL configuration and the second downlink reference UL-DL configuration are used to specify (select, determine) a correspondence between the subframe n in which a PDSCH is allocated and the subframe n+k in which a HARQ-ACK corresponding to the PDSCH is transmitted.

In a case where a single primary cell is set, or in a case where a single primary cell and a single secondary cell are set, and the first downlink reference UL-DL configuration for the primary cell is the same as the first downlink reference UL-DL configuration for the secondary cell, a corresponding first downlink reference UL-DL configuration is used to specify (select, determine) a correspondence between the subframe n in which the PDSCH is allocated and the subframe n+k in which a HARQ-ACK corresponding to the PDSCH is transmitted in each of the two serving cells.

In a case where a single primary cell and a single secondary cell are set, and the first downlink reference UL-DL configuration for the primary cell is different from the first downlink reference UL-DL configuration for the secondary cell, a corresponding second downlink reference UL-DL configuration is used to specify (select, determine) a correspondence between the subframe n in which the PDSCH is allocated and the subframe n+k in which a HARQ-ACK corresponding to the PDSCH is transmitted in each of the two serving cells.

FIG. 21 is a diagram illustrating a correspondence between the subframe n−k in which the PDSCH is allocated and the subframe n in which a HARQ-ACK corresponding to the PDSCH is transmitted in each of the two serving cells. The mobile station apparatus 1 specifies (selects, determines) a value of k on the basis of a table of FIG. 21.

In FIG. 21, in a case where a single primary cell is set, or in a case where a single primary cell and a single secondary cell are set, and the first downlink reference UL-DL configuration for the primary cell is the same as the first downlink reference UL-DL configuration for the secondary cell, an uplink-downlink configuration is set by referring to the first downlink reference UL-DL configuration.

In FIG. 21, in a case where a single primary cell is set, or in a case where a single primary cell and a single secondary cell are set, and the first downlink reference UL-DL configuration for the primary cell is the same as the first downlink reference UL-DL configuration for the secondary cell, an uplink-downlink configuration is set by referring to the second downlink reference UL-DL configuration.

Hereinafter, in description of FIG. 21, the first downlink reference UL-DL configuration and the second downlink reference UL-DL configuration are simply referred to as an uplink-downlink configuration.

In a case where the mobile station apparatus 1 detects, in a subframe n−k (k is specified on the basis of the table of FIG. 21) for a serving cell, transmission of the PDSCH intended for the mobile station apparatus 1 and for which a corresponding HARQ-ACK shall be transmitted, the HARQ-ACK is transmitted in the subframe n.

For example, the mobile station apparatus 1 does not make a response of the HARQ-ACK to transmission of the PDSCH which is used to transmit system information. For example, the mobile station apparatus 1 makes a response of the HARQ-ACK to transmission of the PDSCH which is scheduled by a DCI format including the CRC scrambled with the C-RNTI.

For example, the mobile station apparatus 1 performs transmission of the HARQ-ACK of the PDSCH received in the subframe n−6 and/or n−7 for a serving cell for which the uplink-downlink configuration 1 is set, in the subframe n=2.

In addition, in a case where the first uplink reference UL-DL configuration is set, and the first downlink reference UL-DL configuration and the transmission direction UL-DL configuration are not set, the mobile station apparatus 1 may specify (select, determine) a transmission direction (up/down) on the basis of the first uplink reference UL-DL configuration.

Further, in a case where the first uplink reference UL-DL configuration and the first downlink reference UL-DL configuration are set, and the transmission direction UL-DL configuration is not set, the mobile station apparatus 1 may specify (select, determine) a transmission direction (up/down) on the basis of the first downlink reference UL-DL configuration.

Further, the first downlink reference UL-DL configuration may not be defined for a serving cell which has not received the second information. In this case, the mobile station apparatus 1 and the base station apparatus 3 may perform the above-described process performed on the basis of the first downlink reference UL-DL configuration, on the basis of the first uplink reference UL-DL configuration (serving cell UL-DL configuration). A serving cell which has not received the second information is a serving cell for which the dynamic TDD is not set.

For example, in a case where a single primary cell and a single secondary cell are set; the second information for the primary cell has not been received; the second information for the secondary cell has been received; the first uplink reference UL-DL configuration (serving cell UL-DL configuration) for the primary cell is different from the first downlink reference UL-DL configuration for the secondary cell; and a serving cell is the secondary cell, the second downlink reference UL-DL configuration for the serving cell (secondary cell) may be set on the basis of a pair formed by the first uplink reference UL-DL configuration for the other serving cell (primary cell) and the first downlink reference UL-DL configuration for the serving cell (secondary cell).

For example, in a case where a single primary cell and a single secondary cell are set; the second information for the primary cell has not been received; the second information for the secondary cell has been received; the first uplink reference UL-DL configuration (serving cell UL-DL configuration) for the primary cell is different from the first downlink reference UL-DL configuration for the secondary cell; and a serving cell is the secondary cell, a corresponding second downlink reference UL-DL configuration may be used to specify (select, determine) a correspondence between the subframe n in which the PDSCH is allocated and the subframe n+k in which a HARQ-ACK corresponding to the PDSCH is transmitted in each of the two serving cells.

For example, in a case where a single primary cell and a single secondary cell are set; the second information for the primary cell has not been received; the second information for the secondary cell has been received; and the first uplink reference UL-DL configuration (serving cell UL-DL configuration) for the primary cell is the same as the first downlink reference UL-DL configuration for the secondary cell, a corresponding first uplink reference UL-DL configuration (serving cell UL-DL configuration) may be used to specify (select, determine) a correspondence between the subframe n in which the PDSCH is allocated and the subframe n+k in which a HARQ-ACK corresponding to the PDSCH is transmitted in the primary cell, and a corresponding first downlink reference UL-DL configuration may be used to specify (select, determine) a correspondence between the subframe n in which the PDSCH is allocated and the subframe n+k in which a HARQ-ACK corresponding to the PDSCH is transmitted in the secondary cell.

For example, in a case where a single primary cell and a single secondary cell are set; the second information for the primary cell has not been received; the second information for the secondary cell has been received; and the first uplink reference UL-DL configuration (serving cell UL-DL configuration) for the primary cell is different from the first downlink reference UL-DL configuration for the secondary cell, a primary cell UL-DL configuration is set by referring to the first uplink reference UL-DL configuration for the primary cell in FIGS. 12 and 14.

Hereinafter, discontinuous reception (DRX) of the present invention will be described.

A DRX functionality is set by a high layer (RRC) and is processed by MAC. The DRX functionality controls a PDCCH monitoring activity of the mobile station apparatus 1 for C-RNTI and SPS C-RNTI of the mobile station apparatus 1.

When in RRC_CONNECTED, in a case where the DRX is set, the mobile station apparatus 1 may discontinuously monitor a PDCCH by using a DRX operation described below. Otherwise, the mobile station apparatus 1 may continuously monitor the PDCCH.

The DRX operation is common to a plurality of serving cells.

The high layer (RRC) controls the DRX operation by setting the following plurality of timers and value of drxStartOffset. The high layer (RRC) optionally sets drxShortCycleTimer and shortDRX-Cycle.

onDurationTimer
drx-InactivityTimer
drx-RetransmissionTimer (a single timer for each downlink HARQ process except for a downlink HARQ process on a broadcast process)
longDRX-Cycle
drxShortCycleTimer (optional)
shrtDrx-Cycle (optional)

The base station apparatus 3 may transmit an RRC message including parameters/information indicating values of onDurationTimer, drx-InactivityTimer, drx-RetransmissionTimer, longDRX-Cycle, drxShortCycleTimer, shortDRX-Cycle, and, drxStartOffset, to the mobile station apparatus 1.

The mobile station apparatus 1 may set values of onDurationTimer, drx-InactivityTimer, drx-RetransmissionTimer, longDRX-Cycle, drxShortCycleTimer, shortDRX-Cycle, and, drxStartOffset, on the basis of the received RRC message.

longDRX-Cycle and shortDRX-Cycle are also collectively referred to as a DRX cycle.

onDurationTimer indicates the number of consecutive PDCCH subframes at the beginning of the DRX cycle.

drx-InactivityTimer indicates the number of consecutive PDCCH subframes following a subframe in which a PDCCH indicating an initial transmission of uplink data or downlink data for the mobile station apparatus 1 is mapped.

drx-RetransmissionTimer indicates the maximum number of consecutive PDCCH subframes for downlink retransmission expected by the mobile station apparatus 1. The same value of drx-RetransmissionTimer is applied to all serving cells.

The DRX cycle indicates a periodic repetition of On duration. A period in which inactivity of PDCCH monitoring of the mobile station apparatus 1 on C-RNTI and SPS C-RNTI of the mobile station apparatus 1 is possible follows a period of the On duration.

Figure 22:
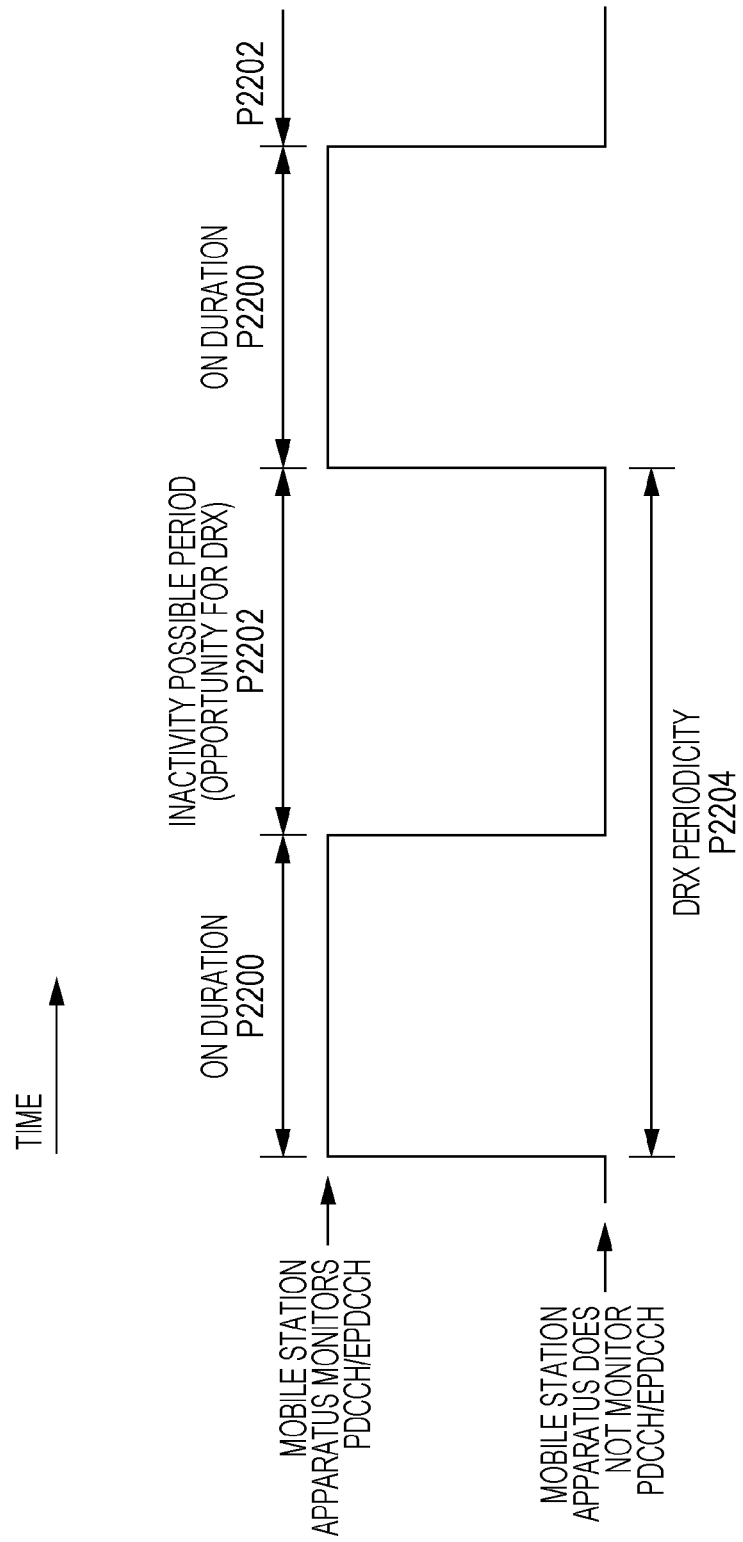
FIG. 22 is a diagram illustrating an example of a DRX cycle in the present embodiment.

FIG. 22 is a diagram illustrating an example of the DRX cycle in the present embodiment. In FIG. 22, a transverse axis is a time axis. In FIG. 22, the mobile station apparatus 1 monitors the PDCCH/EPDCCH in a period P2200 of the On duration. In FIG. 22, a period P2202 following the period P2200 of the On duration is an inactivity possible period. In other words, in FIG. 22, the mobile station apparatus 1 may not monitor the PDCCH/EPDCCH in the period P2202.

drxShortCycleTimer indicates the number of continuous subframes when the mobile station apparatus 1 follows a short DRX cycle.

drxStartOffset indicates a subframe in which the DRX cycle starts.

A HARQ round trip time (RTT) timer is managed for each downlink HARQ process and associated with start of drx-RetransmissionTimer. The HARQ RTT timer indicates the minimum interval from transmission of downlink data to retransmission of the downlink data.

In a case of the TDD, the HARQ RTT timer is set in (k+4) subframes, and k indicates an interval during downlink transmission and HARQ feedback associated with the downlink transmission and is specified (selected, determined) on the basis of the table of FIG. 21.

In addition, in the present embodiment, a single downlink HARQ process controls a HARQ of a single distinct downlink data item (transport block). Further, a single downlink HARQ process may control a HARQ of two distinct downlink data items.

In a case where the DRX cycle is set, an active time includes at least one of the following conditions (i) to (1).
 Condition (i): onDurationTimer, drx-InactivityTimer, drx-RetransmissionTimer, or mac-ContentionResolutionTimer is running
 Condition (j): a scheduling request is transmitted via a PUCCH and is pending.
 Condition (k): there is a possibility that an uplink grant for pending HARQ retransmission may be transmitted, and there is data in a corresponding HARQ buffer.
 Condition (l): after successful reception of a random access response for a preamble which is not selected by the mobile station apparatus 1, a PDCCH with a C-RNTI of the mobile station apparatus 1 and indicating for a new transmission has not been received.

If the timer starts once, the timer is running until the timer is stopped or until the timer expires. Otherwise, the timer is not running. If the timer is not running, the timer may possibly start. If the timer is running, the timer may possibly restart. The timer always starts or restarts from an initial value of the timer.

The preamble is a message 1 of a random access procedure, and is transmitted with a PRACH. The preamble which is not selected by the mobile station apparatus 1 is related to a contention-based random access procedure.

The random access response is a message 2 of the random access procedure, and is transmitted with a PDSCH. The base station apparatus 3 transmits a random access response for a received preamble.

The mobile station apparatus 1 in which the contention-based random access procedure is performed transmits a message 3 after receiving the random access response. The mobile station apparatus 1 monitors the PDCCH/EPDCCH related to a message 4 after transmitting the message 3.

mac-ContentionResolutionTimer indicates the number of consecutive subframes during which the mobile station apparatus 1 monitors the PDCCH/EPDCCH after the message 3 is transmitted.

In addition, the same active time is applied to all activated serving cells. A primary cell is activated at all times. A secondary cell is activated or deactivated by the MAC. The base station apparatus 3 transmits an MAC CE for giving an instruction for activating or deactivating the secondary cell, to the mobile station apparatus 1.

The mobile station apparatus 1 may not monitor the PDCCH/EPDCCH in a deactivated serving cell. The mobile station apparatus 1 may not monitor the PDCCH/EPDCCH for the deactivated serving cell.

Figure 23:
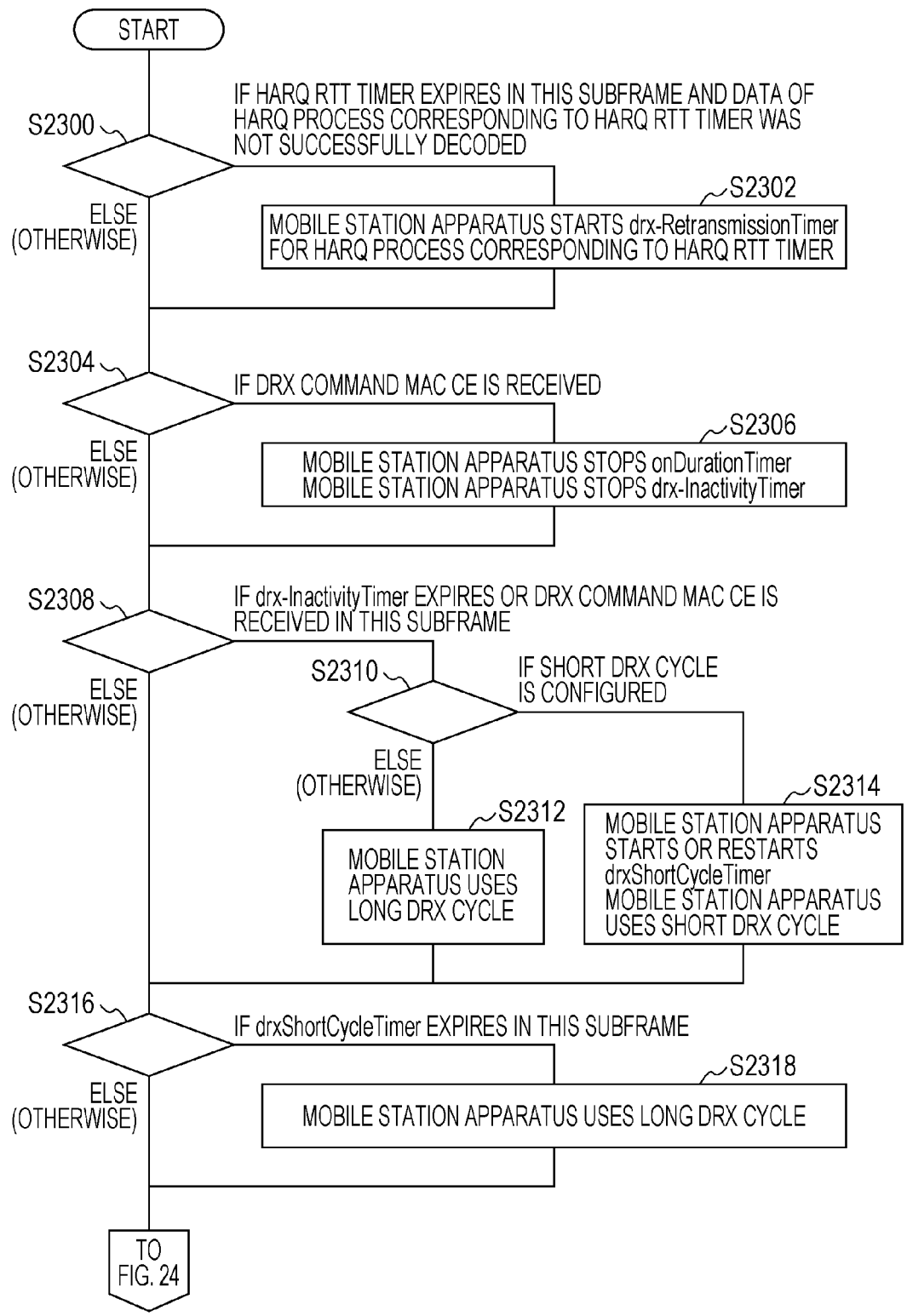
FIG. 23 is a flowchart illustrating an example of a DRX operation in the present embodiment.
Figure 24:
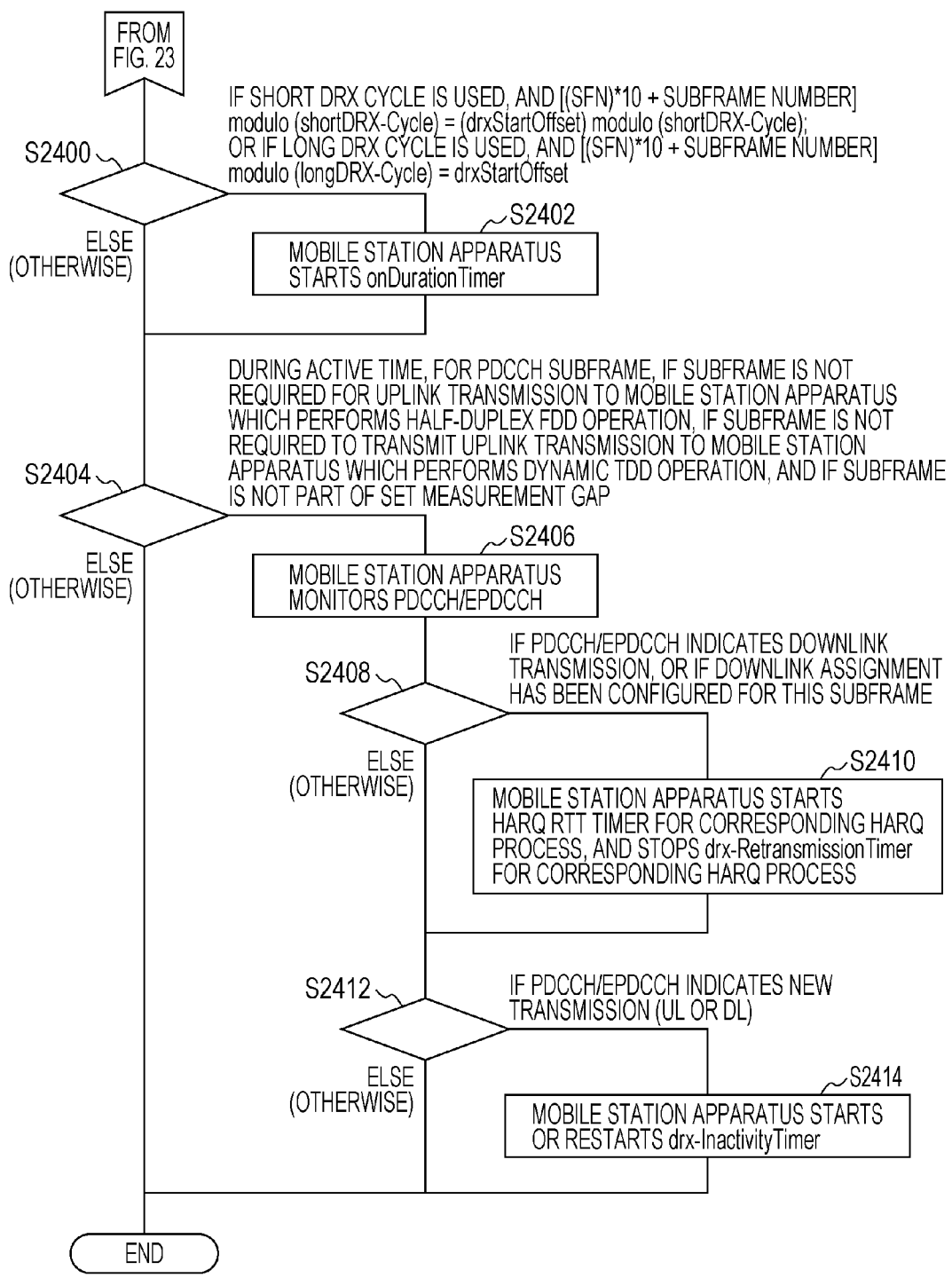
FIG. 24 is a flowchart illustrating an example of a DRX operation in the present embodiment.

FIGS. 23 and 24 are flowcharts illustrating an example of the DRX cycle in the present embodiment. In a case where the DRX is set, the mobile station apparatus 1 performs the DRX operation on each subframe on the basis of the flowcharts of FIGS. 23 and 24.

If a HARQ RTT timer expires in this subframe and data of a HARQ process corresponding to the HARQ RTT timer is not successfully decoded in the mobile station apparatus 1 (step S2300), the mobile station apparatus 1 starts drx-RetransmissionTimer for the HARQ process corresponding to the HARQ RTT timer (step S2302), and proceeds to step S2304. Otherwise (step S2300), the mobile station apparatus 1 proceeds to step S2304.

If a DRX command MAC CE is received (step S2304), the mobile station apparatus 1 stops onDurationTimer and drx-InactivityTimer (step S2306), and proceeds to step S2308. Otherwise (step S2304), the mobile station apparatus 1 proceeds to step S2308.

If drx-InactivityTimer expires or the DRX command MAC CE is received in this subframe (step S2308), the mobile station apparatus 1 proceeds to step S2310. Otherwise (step S2308), the mobile station apparatus 1 proceeds to step S2316.

If the short DRX cycle (shortDRX-Cycle) is not set (step S2310), the mobile station apparatus 1 uses a long DRX cycle (step S2312) and proceeds to step S2316. If the short DRX cycle (shortDRX-Cycle) is set (step S2310), the mobile station apparatus 1 starts or restarts drxShortCycleTimer, uses the short DRX cycle (step S2312), and proceeds to step S2316.

If drxShortCycleTimer expires in this subframe (step S2316), the mobile station apparatus 1 uses the long DRX cycle (step S2318) and proceeds to step S2400 of FIG. 24. Otherwise (step S2316), the mobile station apparatus 1 proceeds to step S2400 of FIG. 24.

(1) If the short DRX cycle is used, and [(SFN)*10+ subframe number] modulo (shortDRX-Cycle)=(drxStart- Offset) modulo (shortDRXCycle), or (2) if the long DRX cycle is used, and [(SFN)*10+subframe number] modulo (longDRX-Cycle)=drxStartOffset (step S2400), the mobile station apparatus 1 starts onDurationTimer (step S2402), and proceeds to step S2404. Otherwise (step S2400), the mobile station apparatus 1 proceeds to step S2404.

If all the following conditions (m) to (q) is satisfied (step S2404), the mobile station apparatus 1 monitors the PDCCH/EPDCCH in this subframe (step S2406), and proceeds to step S2408.

Condition (m): this subframe is included in the active time.
Condition (n): this subframe is a PDCCH subframe.
Condition (o): this subframe is not required for uplink transmission to the mobile station apparatus 1 which performs a half-duplex FDD operation.
Condition (p): this subframe is not the first flexible subframe which is required to transmit uplink signals (the PUSCH and the PUCCH) to the mobile station apparatus 1 which performs a dynamic TDD operation.
Condition (q): this subframe is not part of a configured measurement gap.

The condition (p) includes that this subframe is not the first flexible subframe in which transmission of the PUSCH and/or the PUCCH is scheduled and/or is set.

In a serving cell to which the half-duplex FDD is applied, the mobile station apparatus 1 cannot simultaneously perform uplink transmission and downlink reception. The mobile station apparatus 1 may transmits information indicating whether or not the half-duplex FDD is supported in a band of the FDD, to the base station apparatus 3.

The measurement gap is a time interval for the mobile station apparatus 1 measuring cells of different frequencies and/or different radio access technologies (RATs). The base station apparatus 3 transmits information indicating a period of the measurement gap to the mobile station apparatus 1. The mobile station apparatus 1 sets a period of the measurement gap on the basis of the information.

If at least one of the conditions (m) to (q) is not satisfied (step S2404), the mobile station apparatus 1 finishes the DRX operation on this subframe. That is, if at least one of the conditions (m) to (q) is not satisfied, the mobile station apparatus 1 may not monitor the PDCCH/EPDCCH in this subframe.

In addition, conditions used in step S2404 are not limited to the conditions (m) to (q), conditions different from the conditions (m) to (q) may be used in step S2404, and some of the conditions (m) to (q) may be used.

If a downlink assignment which is received via the PDCCH/EPDCCH indicating downlink transmission, or if a downlink assignment has been configured for this subframe (step S2408), the mobile station apparatus 1 starts the HARQ RTT timer for a corresponding HARQ process, and stops drx-RetransmissionTimer for the corresponding HARQ process (step S2410). Otherwise (step S2408), the mobile station apparatus 1 proceeds to step S2412.

A state in which the downlink assignment has been configured indicates a state in which semi-persistent scheduling is activated by the downlink assignment including an SPS C-RNTI.

If the downlink assignment which is received via the PDCCH/EPDCCH indicating a downlink or uplink initial transmission (step S2412), the mobile station apparatus 1 starts or restarts drx-InactivityTimer (step S2414), and finishes the DRX operation for this subframe. Otherwise (step S2412), the mobile station apparatus 1 finishes the DRX operation for this subframe.

Definition of the PDCCH subframe is different in each of a first embodiment, a second embodiment, and a third embodiment.

Hereinafter, the first embodiment of the present invention will be described.

In the first embodiment, the mobile station apparatus 1 and the base station apparatus 3 specify a PDCCH subframe on the basis of the first downlink reference UL-DL configuration.

In the first embodiment, the mobile station apparatus 1 which communicates with the base station apparatus 3 by using a single primary cell, and the base station apparatus 3 specify (select, determine), as the PDCCH subframe, a subframe which is indicated as a downlink subframe or a subframe including a DwPTS by the first downlink reference UL-DL configuration corresponding to the primary cell in the case of the half-duplex TDD.

In a case where a TDD operation is performed by using a single primary cell, the mobile station apparatus 1 cannot simultaneously perform transmission and reception. In other words, the TDD operation performed by using the single primary cell is half-duplex TDD.

In the first embodiment, the mobile station apparatus 1 which communicates with the base station apparatus 3 by using a plurality of serving cells including a single primary cell and one or a plurality of secondary cells, and the base station apparatus 3 specify (select, determine), as the PDCCH subframe, a subframe which is indicated as a downlink subframe or a subframe including a DwPTS using the first downlink reference UL-DL configuration corresponding to the primary cell in the case of the half-duplex TDD.

In the first embodiment, in the case of the full-duplex TDD, the mobile station apparatus 1 which communicates with the base station apparatus 3 by using a plurality of serving cells including a single primary cell and one or a plurality of secondary cells, and the base station apparatus 3 specify (select, determine), as the PDCCH subframes, the union of subframes which are indicated as a downlink subframe or a subframe including a DwPTS using the first downlink reference UL-DL configuration corresponding to the plurality of serving cells except for a secondary cell in which a parameter (schedulingCellId) is set, if the parameter (schedulingCellId) indicating to which serving cell a downlink assignment for the related secondary cell is sent is set in the secondary cell.

In addition, if the parameter (schedulingCellId) indicating to which serving cell a downlink assignment for the related secondary cell is sent is set in none of the secondary cells, a process excluding a secondary cell in which the parameter (schedulingCellId) is set may not be performed.

FIGS. 25, 26 and 27 are diagrams illustrating an example of the PDCCH subframe in the first embodiment of the present invention. In FIGS. 25, 26 and 27, D indicates a downlink subframe, U indicates an uplink subframe, S indicates a special subframe, and P indicates the PDCCH subframe.

In FIG. 25, a single primary cell is set and a secondary cell is not set for the mobile station apparatus 1. In FIGS. 26 and 27, a single primary cell and a single secondary cell are set for the mobile station apparatus 1. In FIGS. 26 and 27, a PDCCH/EPDCCH corresponding to the single secondary cell is transmitted with the secondary cell.

In FIGS. 25 and 26, the mobile station apparatus 1 performs a half-duplex TDD operation. In FIG. 27, the mobile station apparatus 1 performs a full-duplex TDD operation.

In FIGS. 25 and 26, the mobile station apparatus 1 and the base station apparatus 3 specify, as the PDCCH subframes, subframes 0, 1, 5, 6, 7, 8 and 9 which are indicated as downlink subframes or subframes including a DwPTS by the first downlink reference UL-DL configuration 3 for the primary cell.

In FIG. 27, the mobile station apparatus 1 and the base station apparatus 3 specify, as the PDCCH subframes, the union {0, 1, 3, 4, 5, 6, 7, 8, 9} of subframes which are indicated as downlink subframes or subframes including a DwPTS by the first downlink reference UL-DL configuration 3 for the primary cell and the first downlink reference UL-DL configuration 2 for the secondary cell.

FIG. 28 is a diagram illustrating an example of the DRX operation in the first embodiment of the present invention.

In FIG. 28, a single primary cell is set for the mobile station apparatus 1, the first uplink reference UL-DL configuration for the primary cell is 0, and the first downlink reference UL-DL configuration for the primary cell is 2.

In FIG. 28, a value of onDurationTimer is 6; a value of drx-InactivityTimer is 2; a value of drx-RetransmissionTimer is 3; a value of longDRX-Cycle is 40; and a value of drxStartOffset is 0. In FIG. 28, drxShortCycleTimer and shortDRX-Cycle are not set.

In FIG. 28, a value of the HARQ RTT timer is specified on the basis of the first downlink reference UL-DL configuration 2 and the table of FIG. 21.

In FIG. 28, D indicates a downlink subframe, U indicates an uplink subframe, S indicates a special subframe, and P indicates a PDCCH subframe.

In FIG. 28, a subframe which is indicated as a downlink subframe or a subframe including a DwPTS by the first downlink reference UL-DL configuration is the PDCCH subframe.

In FIG. 28, the number of uplink HARQ processes is seven, and a HARQ process corresponds to a subframe which is indicated as an uplink subframe by the first uplink reference UL-DL configuration.

In FIG. 28, G indicates a subframe to which the PDCCH/EPDCCH used to transmit an uplink grant is mapped, the uplink grant giving an instruction for transmission of a PUSCH corresponding to the uplink HARQ process 5. The uplink grant corresponding to the uplink HARQ process 5 in [SFN=0, subframe 5] gives an instruction for initial transmission of the PUSCH. The uplink grant corresponding to the uplink HARQ process 5 in [SFN=1, subframe 5] gives an instruction for retransmission of the PUSCH.

In FIG. 28, N' indicates a subframe in which the initially transmitted PUSCH corresponding to the uplink HARQ process 5 is allocated, and R' indicates a subframe in which the retransmitted PUSCH corresponding to the uplink HARQ process 5 is allocated.

In FIG. 28, a subframe n in which the uplink grant is allocated and a subframe n+k in which the corresponding PUSCH is allocated are specified on the basis of the first uplink reference UL-DL configuration 0.

In FIG. 28, N indicates a subframe in which an initially transmitted PDSCH is allocated, and R indicates a subframe in which a retransmitted PDSCH is allocated.

In FIG. 28, the mobile station apparatus 1 succeeds in decoding a PDSCH corresponding to the downlink HARQ process 2 in [SFN=0, subframe 4], a PDSCH corresponding to the downlink HARQ process 3 in [SFN=0, subframe 5], a PDSCH corresponding to the downlink HARQ process 4 in [SFN=0, subframe 6], a PDSCH corresponding to the downlink HARQ process 0 in [SFN=1, subframe 1], and a PDSCH corresponding to the downlink HARQ process 1 in [SFN=2, subframe 4].

In FIG. 28, the mobile station apparatus 1 fails to decode a PDSCH corresponding to the downlink HARQ process 0 in [SFN=0, subframe 0], a PDSCH corresponding to the downlink HARQ process 1 in [SFN=0, subframe 1], and a PDSCH corresponding to the downlink HARQ process 1 in [SFN=1, subframe 3].

In FIG. 28, A indicates a subframe included in active time. In FIG. 28, a subframe satisfying the condition (i) "onDurationTimer, drx-InactivityTimer, drx-RetransmissionTimer, or mac-ContentionResolutionTimer is running" and the condition (k) "there is a possibility that an uplink grant for pending HARQ retransmission may be transmitted, and there is data in a corresponding HARQ buffer", is included in the active time. In FIG. 28, mac-ContentionResolutionTimer is not running In FIG. 28, subframes in which an uplink grant for pending HARQ retransmission may possibly be transmitted are [SFN=1, subframe 5] and [SFN=2, subframe 5] which are specified on the basis of the first uplink reference UL-DL configuration.

Consequently, it is possible to efficiently perform DRX in the radio communication system which employs the dynamic TDD.

In addition, in the first embodiment, in a case where a plurality of serving cells are set for the mobile station apparatus 1, and the first downlink reference UL-DL configurations for at least two serving cells are different from each other, a PDCCH subframe may be specified on the basis of the second downlink reference UL-DL configuration instead of the first downlink reference UL-DL configuration.

Hereinafter, the second embodiment of the present invention will be described.

In the first embodiment, a subframe, which is indicated as a downlink subframe by the first downlink reference UL-DL configuration but is indicated as an uplink subframe by the transmission direction UL-DL configuration, is defined as a PDCCH subframe. However, the PDCCH/EPDCCH are (is) not transmitted in the PDCCH subframe.

Therefore, in the second embodiment, the mobile station apparatus 1 and the base station apparatus 3 specify a PDCCH subframe on the basis of the transmission direction UL-DL configuration.

In the second embodiment, the mobile station apparatus 1 which communicates with the base station apparatus 3 by using a single primary cell, and the base station apparatus 3 specify (select, determine), as the PDCCH subframe, a subframe which is indicated as a downlink subframe or a subframe including a DwPTS by the transmission direction UL-DL configuration corresponding to the primary cell in a case of the half-duplex TDD.

In the second embodiment, the mobile station apparatus 1 which communicates with the base station apparatus 3 by using a plurality of serving cells including a single primary cell and one or a plurality of secondary cells, and the base station apparatus 3 specify (select, determine), as the PDCCH subframe, a subframe which is indicated as a downlink subframe or a subframe including a DwPTS by the transmission direction UL-DL configuration corresponding to the primary cell in a case of the half-duplex TDD.

In the second embodiment, in a case of the full-duplex TDD, the mobile station apparatus 1 which communicates with the base station apparatus 3 by using a plurality of serving cells including a single primary cell and one or a plurality of secondary cells, and the base station apparatus 3 specify (select, determine), as the PDCCH subframes, the union of subframes which are indicated as a downlink subframe or a subframe including a DwPTS by the transmission direction UL-DL configuration to the plurality of serving cells except for a secondary cell in which a parameter (schedulingCellId) is set, if the parameter (schedulingCellId) indicating to which serving cell a downlink assignment for the related secondary cell is sent is set in the secondary cell.

FIGS. 29, 30 and 31 are diagrams illustrating an example of the PDCCH subframe in the second embodiment of the present invention. In FIGS. 29, 30 and 31, D indicates a downlink subframe, U indicates an uplink subframe, S indicates a special subframe, and P indicates the PDCCH subframe.

In FIG. 29, a single primary cell is set and a secondary cell is not set for the mobile station apparatus 1. In FIGS. 30 and 31, a single primary cell and a single secondary cell are set for the mobile station apparatus 1. In FIGS. 30 and 31, a PDCCH/EPDCCH corresponding to the single secondary cell is transmitted with the secondary cell.

In FIGS. 29 and 30, the mobile station apparatus 1 performs a half-duplex TDD operation. In FIG. 31, the mobile station apparatus 1 performs a full-duplex TDD operation.

In FIGS. 29 and 30, the mobile station apparatus 1 and the base station apparatus 3 specify, as the PDCCH subframes, subframes 0, 1, 5, 6 and 9 which are indicated as downlink subframes or subframes including a DwPTS by the transmission direction UL-DL configuration 6 for the primary cell.

In FIG. 31, the mobile station apparatus 1 and the base station apparatus 3 specify, as the PDCCH subframes, the union {0, 1, 4, 5, 6, 9} of subframes which are indicated as a downlink subframe or a subframe including a DwPTS by the transmission direction UL-DL configuration 6 for the primary cell and the transmission direction UL-DL configuration 1 for the secondary cell.

Consequently, it is possible to efficiently perform DRX in the radio communication system which employs the dynamic TDD.

Hereinafter, the third embodiment of the present invention will be described.

In the third embodiment, the mobile station apparatus 1 and the base station apparatus 3 specify a PDCCH subframe on the basis of the first uplink reference UL-DL configuration.

In the third embodiment, the mobile station apparatus 1 which communicates with the base station apparatus 3 by using a single primary cell, and the base station apparatus 3 specify (select, determine), as the PDCCH subframe, a subframe which is indicated as a downlink subframe or a subframe including a DwPTS by the first uplink reference UL-DL configuration corresponding for the primary cell in a case of the half-duplex TDD.

In the third embodiment, in a case of the half-duplex TDD, the mobile station apparatus 1 which communicates with the base station apparatus 3 by using a plurality of serving cells including a single primary cell and one or a plurality of secondary cells, and the base station apparatus 3 specify (select, determine), as the PDCCH subframe, a subframe which is indicated as a downlink subframe or a subframe including a DwPTS by the first uplink reference UL-DL configuration corresponding for the primary cell.

In the third embodiment, in a case of the full-duplex TDD, the mobile station apparatus 1 which communicates with the base station apparatus 3 by using a plurality of serving cells including a single primary cell and one or a plurality of secondary cells, and the base station apparatus 3 specify (select, determine), as the PDCCH subframes, the union of subframes which are indicated as a downlink subframe or a subframe including a DwPTS by the first uplink reference UL-DL configuration corresponding for the plurality of serving cells except for a secondary cell which is configured with a parameter (schedulingCellId), if the parameter (schedulingCellId) indicating in which serving cell a downlink assignment for the related secondary cell is sent is configured for the secondary cell.

FIGS. 32, 33 and 34 are diagrams illustrating an example of the PDCCH subframe in the third embodiment of the present invention. In FIGS. 32, 33 and 34, D indicates a downlink subframe, U indicates an uplink subframe, S indicates a special subframe, and P indicates the PDCCH subframe.

In FIG. 32, a single primary cell is set and a secondary cell is not set for the mobile station apparatus 1. In FIGS. 33 and 34, a single primary cell and a single secondary cell are set for the mobile station apparatus 1. In FIGS. 33 and 34, a PDCCH/EPDCCH corresponding to the single secondary cell is transmitted with the secondary cell.

In FIGS. 32 and 33, the mobile station apparatus 1 performs a half-duplex TDD operation. In FIG. 34, the mobile station apparatus 1 performs a full-duplex TDD operation.

In FIGS. 32 and 33, the mobile station apparatus 1 and the base station apparatus 3 specify, as the PDCCH subframes, subframes {0, 1, 5, 6 and 9} which are indicated as downlink subframes or subframes including a DwPTS by the first uplink reference UL-DL configuration 6 for the primary cell.

In FIG. 34, the mobile station apparatus 1 and the base station apparatus 3 specify, as the PDCCH subframes, the union of subframes {0, 1, 5, 6, 9} which are indicated as a downlink subframe or a subframe including a DwPTS by the first uplink reference UL-DL configuration 6 for the primary cell and the first uplink reference UL-DL configuration 0 for the secondary cell.

In the third embodiment, the first flexible subframe which is indicated as an uplink subframe by the first uplink reference UL-DL configuration and is indicated as a downlink subframe by the first downlink reference UL-DL configuration is not a PDCCH subframe. Therefore, in a DRX operation of the third embodiment, the mobile station apparatus 1 uses the following condition (r) instead of the condition (n) in step S2404 of FIG. 24.

Condition (r): this subframe is a subframe indicated as a downlink subframe by at least one first downlink reference UL-DL configuration.

In other words, in the third embodiment, if all of the conditions (m), (o), (p), (q) and (r) are satisfied, the mobile station apparatus 1 may monitor the PDCCH/EPDCCH in this subframe.

Consequently, in the DRX operation of the third embodiment, the mobile station apparatus 1 monitors the PDCCH/EPDCCH in the first flexible subframe.

Consequently, it is possible to efficiently perform DRX in the radio communication system which employs the dynamic TDD.

In addition, in the third embodiment, in a case where a plurality of serving cells are set for the mobile station apparatus 1, and the first uplink reference UL-DL configurations for at least two serving cells are different from each other, a PDCCH subframe may be specified on the basis of the second uplink reference UL-DL configuration instead of the first uplink reference UL-DL configuration.

Further, in the first to third embodiments, a PDCCH subframe may be specified except for a subframe which is required to transmit uplink signals (the PUSCH and the PUCCH) to the mobile station apparatus 1 which performs a dynamic TDD operation. In other words, a PDCCH subframe may be specified except for the first flexible subframe in which transmission of the PUSCH and/or the PUCCH is scheduled and/or is set.

A program which runs in the base station apparatus 3 and the mobile station apparatus 1 according to the present invention is a program (which causes a computer to function) which controls a central processing unit (CPU) and the like to realize the functions of the embodiments according to the present invention. In addition, the information treated in these devices is temporarily accumulated in a random access memory (RAM) during the processing thereof, is then stored in various ROMs such as a flash read only memory (ROM) or hard disk drives (HDDs), and is read by the CPU as necessary so as to be corrected and be written.

In addition, part of the mobile station apparatus 1 and the base station apparatus 3 in the above-described embodiments may be realized by a computer. In this case, a program for realizing the control function is recorded on a computer readable recording medium, and the control function may be realized by a computer system reading and executing the program recorded on the recording medium.

In addition, the "computer system" mentioned here is a computer system which is built into the mobile station apparatus 1 or the base station apparatus 3, and includes hardware such as an OS or peripheral devices. Further, the "computer readable recording medium" refers to a portable medium such as a flexible disk, a magneto-optical disc, a ROM, or a CD-ROM, and a storage device such as a hard disk built into the computer system.

Furthermore, the "computer readable recording medium" may also include one which dynamically holds a program for a short period of time, such as a communication line in a case where the program is transmitted via a network such as the Internet or a communication line such as a telephone line, and one which holds the program for a specific time, such as a nonvolatile memory of the computer system which becomes a server or a client in this case. Moreover, the program may be one which realizes some of the above-described functions, and may be one which realizes the above-described functions in combination with a program which has already been recorded in the computer system.

In addition, the base station apparatus 3 of the above-described embodiments may be realized as an aggregate (device groups) constituted by a plurality of devices. Each of the devices constituting the device group may include each function, or some or all of the functional blocks of the base station apparatus 3 according to the embodiments. The device group may have each general function or each general functional block of the base station apparatus 3. Further, the mobile station apparatus 1 according to the above-described embodiments may communicate with the base station apparatus as an aggregate.

In addition, the base station apparatus 3 in the above-described embodiments may be an evolved universal terrestrial radio access network (EUTRAN). Further, the base station apparatus 3 in the above-described embodiments may have some or all of the functions of the higher node of eNodeB.

Further, part or the whole of the mobile station apparatus 1 and the base station apparatus 3 in the above-described embodiments may be typically implemented by an LSI which is an integrated circuit, and may be realized by a chip set. The respective functional blocks of the mobile station apparatus 1 and the base station apparatus 3 may be separately formed of a chip, and some or all of the blocks may be integrally formed as a chip. Further, a technique for an integrated circuit is not limited to an LSI, and may be realized by a dedicated circuit or a general purpose processor. Furthermore, in a case where a technique for an integrated circuit which replaces the LSI appears with the advance of semiconductor techniques, an integrated circuit based on such a technique may be used.

In addition, in the above-described embodiments, a mobile station apparatus has been described as an example of a terminal apparatus or a communication apparatus, but the present invention is not limited thereto, and is applicable to terminal apparatuses or communication apparatuses, such as non-movable or stationary electronic apparatuses installed indoors or outdoors, for example, AV apparatuses, kitchen apparatuses, cleaning and washing apparatuses, air-conditioning apparatuses, vending machines, and other pieces of household equipment.

As mentioned above, although the embodiments of the present invention have been described in detail with reference to the drawings, a specific configuration is not limited to the embodiments, and design modifications and the like may occur within the scope without departing from the spirit of the invention. In addition, various alterations may occur in the claims of the present invention, and embodiments obtained by appropriately combining technical means which are respectively disclosed in different embodiments are also included in the technical scope of the present invention. Further, configurations in which the elements which are disclosed in the above-described respective embodiments and achieve the same effect are replaced with each other are also included in the technical scope of the present invention.

DESCRIPTION OF REFERENCE NUMERALS 1 (1A, 1B, 1C) MOBILE STATION APPARATUS
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL PORTION
1013 SUBFRAME SETTING PORTION
1015 SCHEDULING INFORMATION ANALYSIS PORTION
1017 DRX CONTROL PORTION
3011 RADIO RESOURCE CONTROL PORTION
3013 SUBFRAME SETTING PORTION
3015 SCHEDULING PORTION
3017 DRX CONTROL PORTION

The invention claimed is:

1. A terminal apparatus which is configured with a serving cell and DRX (discontinuous reception) functionality, the terminal apparatus comprising:
a reception circuit that:
receives first information indicating an uplink-downlink configuration and second information indicating an uplink-downlink configuration, the second information being different from the first information;

receives third information indicating an uplink-downlink configuration via a physical downlink control channel, the third information being different from the first information and the second information; and during an active time, monitors a physical downlink control channel with C-RNTI (cell radio network temporary identifier) in a subframe on the basis of whether or not the subframe is indicated as a downlink subframe by the uplink-downlink configuration indicated by the third information and whether or not the subframe is part of a configured measurement gap; and a transmission circuit that:

transmits a physical uplink shared channel corresponding to the physical downlink control channel with C-RNTI on the basis of an uplink-reference uplink-downlink configuration, the uplink-reference uplink-downlink configuration being the uplink-downlink configuration indicated by the first information, and transmits a HARQ-ACK (hybrid automatic repeat request acknowledgement) corresponding to a physical downlink shared channel on the basis of a downlink-reference uplink-downlink configuration, the downlink-reference uplink-downlink configuration being the uplink-downlink configuration indicated by the second information; wherein a physical downlink control channel subframe is a subframe indicated by the uplink-downlink configuration indicated by the first information as a downlink subframe or a subframe including DwPTS (downlink pilot time slot), and the active time includes a time while a timer specifying a number of consecutive physical downlink control channel subframe(s) at the beginning of a DRX cycle is running.

2. The terminal apparatus according to claim 1, wherein the timer is an onDurationTimer.

3. The terminal apparatus according to claim 1, wherein the active time includes a time while a second timer for a HARQ (hybrid automatic repeat request) process is running, the second timer being a drx-Retransmisison-Timer, in a case that a HARQ RTT (round trip time) timer for the HARQ process expires and data of the HARQ process was not successfully decoded, the second timer for the HARQ process is started, a value of the HARQ RTT timer is set with reference to the uplink-downlink configuration indicated by the second information.

4. A radio communication method used for a terminal apparatus which is configured with a serving cell and DRX (discontinuous reception) functionality, the radio communication method comprising:

receiving first information indicating an uplink-downlink configuration and second information indicating an uplink-downlink configuration, the second information being different from the first information, and receiving third information indicating an uplink-downlink configuration via a physical downlink control channel, the third information being different from the first information and the second information;

during an active time, monitoring a physical downlink control channel with C-RNTI (cell radio network temporary identifier) in a subframe on the basis of whether or not the subframe is indicated as a downlink subframe by the uplink-downlink configuration indicated by the third information and whether or not the subframe is part of a configured measurement gap;

transmitting a physical uplink shared channel corresponding to the physical downlink control channel with C-RNTI on the basis of an uplink-reference uplink-downlink configuration, the uplink-reference uplink-downlink configuration being the uplink-downlink configuration indicated by the first information; and transmitting a HARQ-ACK (hybrid automatic repeat request acknowledgement) corresponding to a physical downlink shared channel on the basis of a downlink reference uplink-downlink configuration, the downlink-reference uplink-downlink configuration being the uplink-downlink configuration indicated by the second information; wherein a physical downlink control channel subframe is a subframe indicated by the uplink-downlink configuration indicated by the first information as a downlink subframe or a subframe including DwPTS (downlink pilot time slot), and the active time includes a time while a timer specifying a number of consecutive physical downlink control channel subframe(s) at the beginning of a DRX cycle is running.

5. The radio communication method according to claim 4, wherein the timer is an onDurationTimer.

6. The radio communication method according to claim 4, wherein the active time includes a time while a second timer for a HARQ (hybrid automatic repeat request) process is running, the second timer being a drx-Retransmisison-Timer, in a case that a HARQ RTT (round trip time) timer for the HARQ process expires and data of the HARQ process was not successfully decoded, the second timer for the HARQ process is started, a value of the HARQ RTT timer is set with reference to the uplink-downlink configuration indicated by the second information.

7. A base station apparatus configured to communicate with a terminal apparatus configured with a serving cell and DRX (discontinuous reception) functionality, the base station apparatus comprising:

a transmission circuit that:

transmits first information indicating an uplink-downlink configuration and second information indicating an uplink-downlink configuration, the second information being different from the first information;

transmits third information indicating an uplink-downlink configuration via a physical downlink control channel, the third information being different from the first information and the second information; and during an active time, transmits a physical downlink control channel with C-RNTI (cell radio network temporary identifier) in a subframe on the basis of whether or not the subframe is indicated as a downlink subframe by the uplink-downlink configuration indicated by the third information and whether or not the subframe is part of a configured measurement gap, a reception circuit that:

receives a physical uplink shared channel corresponding to the physical downlink control channel with C-RNTI on the basis of an uplink-reference uplink-downlink configuration, the uplink-reference uplink-downlink configuration being the uplink-downlink configuration indicated by the first information, and receives a HARQ-ACK (hybrid automatic repeat request acknowledgement) corresponding to a physical downlink shared channel on the basis of a downlink reference uplink-downlink configuration, the downlink-reference uplink-downlink configuration being the uplink-downlink configuration indicated by the second information; wherein a physical downlink control channel subframe is a subframe indicated by the uplink-downlink configuration indicated by the first information as a downlink subframe or a subframe including DwPTS (downlink pilot time slot), and the active time includes a time while a timer specifying a number of consecutive physical downlink control channel subframe(s) at the beginning of a DRX cycle is running.

8. The base station apparatus according to claim 7, wherein the timer is an onDurationTimer.

9. The base station apparatus according to claim 7, wherein the active time includes a time while a second timer for a HARQ (hybrid automatic repeat request) process is running, the second timer being a drx-Retransmisison-Timer, in a case that a HARQ RTT (round trip time) timer for the HARQ process expires and data of the HARQ process was not successfully decoded, the second timer for the HARQ process is started, a value of the HARQ RTT timer is set with reference to the uplink-downlink configuration indicated by the second information.

10. A radio communication method used for a base station apparatus configured to communicate with a terminal apparatus which is configured with a serving cell and DRX (discontinuous reception) functionality, the radio communication method comprising:

transmitting first information indicating an uplink-downlink configuration and second information indicating an uplink-downlink configuration, the second information being different from the first information, and transmitting third information indicating an uplink-downlink configuration via a physical downlink control channel, the third information being different from the first information and the second information;

during an active time, transmitting a physical downlink control channel with C-RNTI (cell radio network temporary identifier) in a subframe on the basis of whether or not the subframe is indicated as a downlink subframe by the uplink-downlink configuration indicated by the third information and whether or not the subframe is part of a configured measurement gap;

receiving a physical uplink shared channel corresponding to the physical downlink control channel with C-RNTI on the basis of an uplink-reference uplink-downlink configuration, the uplink-reference uplink-downlink configuration being the uplink-downlink configuration indicated by the first information; and receiving a HARQ-ACK (hybrid automatic repeat request acknowledgement) corresponding to a physical downlink shared channel on the basis of a downlink reference uplink-downlink configuration, the downlink-reference uplink-downlink configuration being the uplink-downlink configuration indicated by the second information; wherein a physical downlink control channel subframe is a subframe indicated by the uplink-downlink configuration indicated by the first information as a downlink subframe or a subframe including DwPTS (downlink pilot time slot), and the active time includes a time while a timer specifying a number of consecutive physical downlink control channel subframe(s) at the beginning of a DRX cycle is running.

11. The radio communication method according to claim 10, wherein the timer is an onDurationTimer.

12. The radio communication method according to claim 10, wherein the active time includes a time while a second timer for a HARQ (hybrid automatic repeat request) process is running, the second timer being a drx-Retransmisison-Timer, in a case that a HARQ RTT (round trip time) timer for the HARQ process expires and data of the HARQ process was not successfully decoded, the second timer for the HARQ process is started, a value of the HARQ RTT timer is set with reference to the uplink-downlink configuration indicated by the second information.

* * * * *